(12) United States Patent
Katoh et al.

(10) Patent No.: US 7,949,755 B2
(45) Date of Patent: May 24, 2011

(54) NETWORK/SERVICE CONTROL METHOD

(75) Inventors: Masafumi Katoh, Kawasaki (JP);
Tsuguo Kato, Kawasaki (JP); Ryuichi Takechi, Kawasaki (JP); Yoichiro Igarashi, Kawasaki (JP); Hitoshi Yamada, Shinagawa (JP)

(73) Assignee: Fujitsu Limited, Kawasaki (JP)

( * ) Notice: Subject to any disclaimer, the term of this patent is extended or adjusted under 35 U.S.C. 154(b) by 335 days.

(21) Appl. No.: 11/753,604

(22) Filed: May 25, 2007

(65) Prior Publication Data
US 2007/0250628 A1   Oct. 25, 2007

Related U.S. Application Data

(63) Continuation of application No. PCT/JP2004/017618, filed on Nov. 26, 2004.

(51) Int. Cl.
*G06F 15/16* (2006.01)

(52) U.S. Cl. ........................................................ 709/226

(58) Field of Classification Search .................. 709/225, 709/226
See application file for complete search history.

(56) References Cited

U.S. PATENT DOCUMENTS

| | | | |
|---|---|---|---|
| 6,085,238 A * | 7/2000 | Yuasa et al. ................ | 709/223 |
| 6,683,853 B1 | 1/2004 | Kannas et al. | |
| 7,161,914 B2 | 1/2007 | Shoaid et al. ................ | 370/331 |
| 2001/0025280 A1 | 9/2001 | Mandato et al. ................ | 707/3 |
| 2003/0135582 A1 | 7/2003 | Allen et al. ................ | 709/217 |
| 2004/0184483 A1 | 9/2004 | Okamura et al. ............ | 340/477 |
| 2005/0021713 A1 * | 1/2005 | Dugan et al. ................ | 709/223 |
| 2005/0029342 A1 | 2/2005 | Sugimoto et al. ............ | 235/380 |
| 2005/0188073 A1 | 8/2005 | Nakamichi et al. .......... | 709/223 |
| 2005/0259620 A1 | 11/2005 | Igarashi et al. ................ | 370/331 |
| 2006/0178756 A1 * | 8/2006 | Gotoh et al. ................ | 700/9 |
| 2007/0005712 A1 * | 1/2007 | Tiainen ........................ | 709/206 |
| 2007/0130260 A1 * | 6/2007 | Weintraub et al. ............ | 709/204 |
| 2008/0098060 A1 * | 4/2008 | Boni et al. ................ | 709/201 |

FOREIGN PATENT DOCUMENTS

| | | |
|---|---|---|
| JP | 2001-344200 | 12/2001 |
| JP | 2003-091678 | 3/2003 |
| JP | 2003-516032 | 5/2003 |
| JP | 2003-216641 | 7/2003 |
| JP | 2003-333639 | 11/2003 |
| JP | 2004-153778 | 5/2004 |
| JP | 2004-206670 | 7/2004 |

(Continued)

OTHER PUBLICATIONS

Katoh, M., "Next Generation IP Network Control Based on Traffic Engineering," The ATM Forum ICBN2004, http://www.atmforum.com/meetings/icbn04-program.html.

(Continued)

*Primary Examiner* — Wing F Chan
*Assistant Examiner* — Tesfay Yohannes
(74) *Attorney, Agent, or Firm* — Staas & Halsey LLP

(57) ABSTRACT

A network/service control method comprises a step of acquiring, when providing a communication service to a user, a user context defined as knowledge information about the user associated with an environment surrounding the user and a past behavior pattern of the user, a step of acquiring a user profile defined as information about a user's favorite registered previously by the user at arbitrary timing, and a service control step of determining network requirements for providing the communication service on the basis of the user context and the user profile.

2 Claims, 28 Drawing Sheets

FOREIGN PATENT DOCUMENTS

| | | |
|---|---|---|
| JP | 2004-236198 | 8/2004 |
| JP | 2004-336309 | 11/2004 |
| KR | 10-2004-0033988 | 4/2004 |
| WO | WO 2004/073269 | 8/2004 |
| WO | WO 2004/080008 | 9/2004 |

OTHER PUBLICATIONS

Katoh, M., "Strategy of Development of Ubiquitous Network—Utilization of Knowledge Based on Network and Middleware," Ubiquitous Networking Forum, Ubiquitous Strategy Symposium, http://www.ubiquitous-forum.jp/documents/sympo20040624/index.html.

Ohashi, M., "Context & Profiling—With Semantic Web," The Institute of Electronics, Information and Communication Engineers, Technical Committee on Ubiquitous and Real-World Oriented Networking (URON), http://www.ieice.org/cs/uron/workshop2004.html.

Imai, K., "4G Mobile Network and its Extension to Ubiquitous World," The Institute of Electronics, Information and Communication Engineers, Technical Committee on Ubiquitous and Real-World Oriented Networking (URON), http://www.ieice.org/cs/uron/workshop2004.html.

International Search Report issued in corresponding PCT Application No. PCT/JP2004/017618 (2 pages).

Written Opinion of the International Searching Authority in corresponding PCT Publication No. WO 2006/057048 (6 pages).

Japanese Office Action (Notice of Reason for Rejection) mailed Oct. 26, 2010 in corresponding Japanese Patent Application No. 2006-546509.

Korean Office Action mailed May 30, 2008 in corresponding Korean Application No. 10-2007-7014426.

\* cited by examiner

FIG. 4

EXAMPLE OF USER PROFILE OF USER A

| PARAMETERS | CONDITION 1 | CONDITION 2 | ... |
|---|---|---|---|
| LOCATION | ON THE WAY TO COMPANY FROM HOME (ON COMMUTING) | AT HOME | ... |
| DISTRIBUTING DESTINATION | MOBILE TERMINAL | HDTV | ... |
| BANDWIDTH | 384Kbps | 20Mbps | ... |
| DELAY TYPE | CLASS A (LOW DELAY) | CLASS A (LOW DELAY) | ... |
| LANGUAGE | JAPANESE | JAPANESE | ... |
| SUBTITLE | VOICE CONVERSION | JAPANES SUBTITLE | ... |
| ... | ... | ... | ... |

FIG. 5

| EXAMPLE OF USER CONTEXT OF USER A |
|---|

| PARAMETER | STATUS |
|---|---|
| LOCATION | ON THE WAY TO COMPANY FROM HOME |
| TERMINAL IN USE | MOBILE TERMINAL |
| ... | ... |

FIG. 6

EXAMPLE OF SERVICE PROFILE

| PARAMETER | CONTENT 1 | CONTENT 2 | ... |
|---|---|---|---|
| NAME | MOVIE A | CONCERT VTR OF B-PHILHARMONIC ORCHESTRA | ... |
| RECOMMENDED BANDWIDTH | 3M~6Mbps | 20Mbps | ... |
| TIME | 130MIN | 50MIN | ... |
| LANGUAGE | ENGLISH | JAPANESE | ... |
| SUBTITLE | JAPANESE/ENGLISH | NO SUBTITLE | ... |
| ... | ... | ... | ... |

FIG. 7

EXAMPLE OF NETWORK CONTEXT

| PARAMETER | CONDITION 1 | CONDITION 2 | ... |
|---|---|---|---|
| TARGET EQUIPMENT | ROUTER A | CONTENT SERVER A | ... |
| TIME | 9:00 – 10:00 ON WEEKDAY | 20:00 – 22:00 ON HOLIDAY | ... |
| CONTROL | AVOIDANCE | AVOIDANCE | ... |
| REMARKS | TRAFFIC CONCENTRATED DUE TO LOCATING ON OFFICE-STREET | TRAFFIC CONCENTRATED DUE TO BROADCASTING OF POPULAR CONTENT | ... |

FIG. 21

| RELATION MANAGEMENT/ATTRIBUTE MANAGEMENT INDEPENDENT TYPE |

OBJECT/USER RELATION MANAGEMENT DB

| OBJECT | USER |
|--------|-------|
| #0551  | #masa |
| #0703  | #fumi |
| #2385  | #katoh |
| ⋮ | ⋮ |

OBJECT/ATTRIBUTE MANAGEMENT DB

| OBJECT | ATTRIBUTE |
|--------|-----------|
| #0551  | CD |
| #0703  | HANDHELD PC |
| #2385  | MEETING ROOM |
| ⋮ | ⋮ |

FIG. 22

| RELATION MANAGEMENT/ATTRIBUTE MANAGEMENT INTEGRATION TYPE |
|---|

| RELATION/ATTRIBUTE INTEGRATION MANAGEMENT DB |
|---|

| USER | OBJECT | ATTRIBUTE |
|---|---|---|
| #masa | #0551 | CD |
| #fumi | #0703 | HANDHELD PC |
| #katoh | #2385 | MEETING ROOM |
| ⋮ | ⋮ | ⋮ |

NETWORK/SERVICE CONTROL METHOD

CROSS-REFERENCE TO RELATED APPLICATIONS

This is a continuation of Application PCT/JP2004/017618, filed on Nov. 26, 2004, now pending, the contents of which are herein wholly incorporated by reference.

BACKGROUND OF THE INVENTION

The present invention relates to a technology of controlling a network and a service.

Such a service has hitherto existed that a terminal as a data arrival destination is changed and a receiving terminal is selected based on a hypothesis about a user's intention drawn from a user peripheral context (such as time/location, personal belonging and a peripheral device) and a past behavior pattern (which will hereinafter be also termed a user context) (refer to, e.g., Patent document 1). Made further in a ubiquitous network is a study about providing a service and information matching most with a user context on the basis of information on an object in the real world (refer to, e.g., Non-Patent document 1, Non-Patent document 2, Non-Patent document 3).

Moreover, communication route control and QoS (Quality of Service) control are conducted by use of a traffic engineering technology with respect to network control when distributing the information. This technology enables the allocation of the network resources, which simultaneously actualizes network load sharing and QoS guarantee. For example, in a state (context) where two types of services, i.e., a best effort type service and a bandwidth guarantee type service exist together in an MPLS (Multi Protocol Label Switching) network, there is such a technology that a bandwidth reserved for the bandwidth guarantee type involves selecting a shortest route to minimize consumption of resources, and a label path of the best effort type involves dynamically changing a traffic flow, whereby the whole network absorbs influence exerted by the bandwidth-guaranteed communications upon the best effort type communications in a way that reduces deterioration of the QoS to the greatest possible degree, which might be caused by preferentially processing packets of the bandwidth guarantee type (refer to, e.g., Patent document 2, Non-Patent document 4).

Further, a technology as another traffic engineering technology is that, for example, the whole network is optimized by searching for a network/application server pair that satisfies the QoS by simultaneously taking account of loads of both of a network and an application server, and uniformly distributes the load of the whole network (refer to Patent document 3).

Moreover, there exists a technology of evaluating a user context, an application QoS requirement and a network context on the occasion of performing handover of a terminal communicating with a first network to a second network (refer to, e.g., Patent document 4). Furthermore, there is a technology of managing a relation between a user and an object read by a reader carried by the user (refer to Patent document 5).

[Patent document 1] Japanese Patent Application Laid-Open Publication No. 2004-206670
[Patent document 2] Japanese Patent Application Laid-Open Publication No. 2004-236198
[Patent document 3] Publication No. WO/2004/073269
[Patent document 4] Japanese Patent Application Laid-Open Publication No. 2003-333639
[Patent document 5] International Application No. PCT/JP2003/002498 (Publication No. WO/2004/080008)
[Non-Patent document 1] Masafumi Katoh, "Strategy of Development of Ubiquitous Network-Utilization of Knowledge Based on Network and Middleware", [online], Jun. 24, 2004, Ubiquitous Networking Forum, Ubiquitous Strategy Symposium, Internet <URL:http://www.ubiquitous-forum.jp/documents/sympo20040624/index.html>
[Non-Patent document 2] Masayosi Ohhashi, "Context & Profiling-Semantic Web Utilizing Approach", [online], Jul. 20, 2004, The Institute of Electronics, Information and Communication Engineers, Technical Committee on Ubiquitous and Real-World Oriented Networking (URON), Internet <URL:http://www.ieice.org/cs/uron/workshop2004.html>
[Non-Patent document 3] Kazuo Imai, "Fourth Generation Mobile Network and Development into Ubiquitous", [online], Jun. 20, 2004, The Institute of Electronics, Information and Communication Engineers, Technical Committee on Ubiquitous and Real-World Oriented Network Shop (URON), Internet <URL:http://www.ieice.org/cs/uron/workshop2004.html>
[Non-Patent document 4] Masafumi Katoh, "Next generation IP network control based on traffic engineering", [online], Apr. 7, 2004, The ATM Forum ICBN2004, Internet <URL: http://www.atmforum.com/meetings/icbno4-program-.html>

SUMMARY OF THE INVENTION

These technologies have, however, a scheme of distributing the information with an emphasis put on only a NW context or only a user context, and provide, i.e., services taking account of only a requirement of any one of a user and a network operator, but do not take into consideration a requirement of a service provider that distributes, e.g., contents. There is not yet considered a technology of controlling the network (which will hereinafter be abbreviated to NW) and the service by simultaneously taking account of the user context, the NW context and a recommended value about a content distribution method of the contents distributed to the users, this value being defined as the requirement of the service provider.

The present invention basically aims at controlling the NW by automatically taking account of requests of the user, the network operator and the service provider. Further, the present invention aims at, even if the requests of these three parties get conflicted, automatically finding out a point of compromise. It is one object of the present invention to automatically determine, on the occasion of providing communication services such as distributing the contents, a NW request condition by use of the user context, information about a favorite of the user and recommended information of the service provider. It is another object of the present invention to provide, on the occasion of performing the NW control satisfying a determined request condition, a technology of dynamically optimizing allocation of network resources by using the NW context and a NW operation policy. It is yet another object of the present invention to provide a technology of reflecting intentions of the user and of the service provider, and simultaneously scheming to effectively utilize the NW resources. It is still another object of the present invention to provide the service by a method of interpreting and meeting the request of the user without user's designating any request in such a context that the user himself or herself moving around under a variety of environments is hard to designate the user's request corresponding to the context from time to time.

To accomplish the objects, a network/service control method according to the present invention comprises:

a step of acquiring, when providing a communication service to a user, a user context defined as knowledge information about the user such as an environment surrounding the user and a past behavior pattern of the user;

a step of acquiring a user profile defined as information about a user's favorite registered previously by the user at arbitrary timing; and a service control step of determining requirements or conditions for a network (referred as network requirements below) to provide the communication service on the basis of the user context and the user profile.

Further, a network/service control method according to the present invention comprises:

a step of acquiring, when providing a communication service to a user, a user context defined as knowledge information about the user such as an environment surrounding the user and a past behavior pattern of the user;

a step of acquiring a user profile defined as information about a user's favorite registered previously by the user at arbitrary timing;

a step of acquiring a service profile defined as a recommended value about providing the communication service registered previously at arbitrary timing; and a service control step of determining network requirements for providing the communication service on the basis of the user context, the user profile and the service profile.

Moreover, the network/service control method according to the present invention further comprises:

a step of acquiring a network context defined as knowledge information about a traffic context, network performance and information obtained from operating experiences;

a step of acquiring an operation policy defined as information about a network operation policy registered previously at arbitrary timing; and a network control step of allocating network resources for providing the communication service to the user on the basis of the network requirements, the network context and the operation policy.

Still further, in the network/service control method according to the present invention, the network context contains at least any one of information about a tendency of demand for the network, information about a present usage of the network resources, information about a network behavior pattern occurred when abnormality happens and information about a network operation pattern occurred corresponding to the control over the network.

Yet further, in the network/service control method according to present invention, the service control step includes, if a condition specified by the user profile is different from a condition specified by the service profile, a first setting step of setting the network requirements in a way that prioritizes any one of the preset conditions.

Moreover, in the network/service control method according to the present invention, the service control step includes, if the condition specified by the user profile is different from the condition specified by the service profile, a second setting step of setting the network requirements in a way that compares contents of data specified by the two profiles with each other.

Further, in the network/service control method according to the present invention, the second setting step includes setting, as the network requirements, the condition having a stricter request in the conditions registered in the user profile and in the service profile.

Further, in the network/service control method according to the present invention, the second setting step includes setting, as the network requirements, the condition having a more relaxed request in the conditions registered in the user profile and in the service profile.

Further, in the network/service control method according to the present invention, the second setting step includes setting again the network requirements by relaxing the set condition if a request for the communication service to the user, which has been conducted based on the set network requirements, falls into call blocking.

Further, in the network/service control method according to the present invention, the second setting step includes referring to and setting, in the network requirements, a part of parameters of those registered in the user profile and in the service profile.

Further, in the network/service control method according to the present invention, the part of parameters are defined as a product set of the parameters registered in the two profiles including the user profile and the service profile.

Further, in the network/service control method according to the present invention, the second setting step includes setting, as the network requirements, a sum of sets of the parameters registered in the two profiles including the user profile and the service profile.

Further, the network/service control method according to the present invention further comprises a third setting step of checking, if there are, in the parameters treated in the two profiles including the user profile and the service profile, the parameters of which types are coincident with each other, further if any one or both of contents of these parameters is or are described not in specified value(s) but in range(s) and if different ranges are specified, whether a common area exists in the two ranges or not, and setting, as the network requirements, the common area if the two ranges have the common area and a most approximate value to each other in the ranges of the parameters of the two profiles whereas if none of the common area exists.

Further, the network/service control method according to the present invention further comprises a step of setting, as the network requirements, a value showing a strict condition in the common area.

Further, the network/service control method according to present invention further comprises a step of setting, as the network requirements, a value showing a relaxed condition in the common area.

Further, the network/service control method according to the present invention further comprises a step of giving a request for the user context to user context sensing/management means managing the user context from service control means generating the network requirements when a service is requested; and a step of giving notification of the user context requested by the service control means from the user context sensing/management means.

Further, the network/service control method according to the present invention further comprises a step of transmitting the user context to context-aware service control means generating the network requirements from said context management means managing the user context when a predetermined condition is met.

Further, the network/service control method according to the present invention further comprises a step of checking whether the predetermined condition is met or not when a change occurs in the user context.

Further, the network/service control method according to the present invention further comprises a step of checking whether the predetermined condition is met or not at a time interval of a predetermined period.

Further, the network/service control method according to the present invention further comprises a step of determining time when checking whether the predetermined condition is met or not, and determining next check time from the previous check time according to a rule that changes corresponding to a context.

Further, in the network/service control method according to the present invention, the step of determining the time when checking whether the predetermined condition is met or not, includes a step of determining whether an in-depth check is required or not, and a step of determining, when determining the necessity for the in-depth check, the next check time at a shortened time-interval from the previous check time.

Further, in the network/service control method according to the present invention, the step of checking whether the predetermined condition is met or not, includes a step of determining, when determining that the in-depth check is not required, the next check time at an elongated time interval from the previous check time.

Further, the network/service control method according to the present invention further comprises a step of checking whether the predetermined condition is met or not at fixed time on a fixed day.

Further, in the network/service control method according to the present invention, the step of acquiring the user context includes:
  a step of associating identifying information acquired from an electronic tag with identifying information of a terminal that reads the electronic tag; and
  a step of setting, as the user context, a relation between an object attached with the electronic tag and a possessor of the object, which is drawn from an associated relation between the identifying information acquired from the electronic tag and the terminal identifying information.

Further, in the network/service control method according to the present invention, the step of acquiring the user context includes:
  a step of reading information from the electronic tag of the object attached with the electronic tag by a reader disposed at a predetermined place;
  a step of recognizing that the object attached with the electronic tag passes through a predetermined place by reading the information from the electronic tag with the reader; and
  a step of recognizing, as the user context, that the object passes through the place where the reader is disposed.

Further, in the network/service control method according to the present invention, the step of acquiring the user context includes:
  a step of acquiring, as the user context, locating information of the object by use of Global Positioning System.

Further, in the network/service control method according to the present invention, the electronic tag stores identifying information of the electronic tag and attribute information showing information about the object attached with the electronic tag.

Further, the network/service control method according to the present invention further comprises: a step of reading the attribute information from a server storing the attribute information showing detailed information about the object attached with the electronic tag by said context management means managing the user context.

Further, in the network/service control method according to the present invention, the reading step includes a step of accessing the server and reading the attribute information there from on the basis of the identifying information stored in the electronic tag by the context management means.

Further, in the network/service control method according to the present invention, the reading step includes:
  a step of acquiring, by the content management means, an address of an server storing the attribute information of the object attached with the electronic tag from an identifying information/network address resolution server that manages the address of the server storing the attribute information of the object attached with the electronic tag, on the basis of the identifying information of the electronic tag; and
  a step of acquiring, by the context management means, the attribute information from the server by use of the address of the server.

Further, in the network/service control method according to the present invention, the reading step includes:
  a step of acquiring, by the context management means, the address of the server storing the attribute information by accessing a domain name system server, from an identifier stored in the electronic tag; and
  a step of acquiring, by the context management means, the attribute information from the server on the basis of the acquired address.

Further, in the network/service control method according to the present invention, the electronic tag stores the identifying information, a network address of the server storing the attribute information or a network address of the identifying information/network address resolution server that should be accessed for acquiring the network address of the server storing the attribute information.

Further, the network/service control method according to the present invention further comprises a step of recognizing an object moving direction from a history of at least one or more readers acquiring the information of the electronic tag of the object.

Further, the network/service control method according to the present invention further comprises a step of recognizing that the object and a person move together, from the same motion taken by the object and by the person.

Further, the network/service control method according to the present invention further comprises a step of transmitting the attribute information of a place where the reader exists to the context management means.

Further, the network/service control method according to the present invention further comprises:
  a step of transmitting an identifier of the place where the reader exists to the context management means managing the context; and
  a step of generating the attribute information of the place from the received identifier by the context management means.

Further, the network/service control method according to the present invention further comprises a step of reading, by the context management means managing the user context, the attribute information from the server storing the attribute information showing the detailed information about the object.

Further, in the network/service control method according to the present invention, the reading step includes a step of reading, by the context management means managing the user context, the attribute information in a way that accesses the server on the basis of the identifying information stored in the electronic tag.

Further, in the network/service control method according to the present invention, the reading step includes:

a step of acquiring, by the context management means managing the user context, an address of a server storing the attribute information of the object attached with the electronic tag from the identifying information/network address resolution server that manages the address of the server storing the attribute information of the object attached with the electronic tag, on the basis of the identifying information of the electronic tag; and a step of acquiring, by the context management means, the attribute information from the server in a way that uses the address of the server.

Further, in the network/service control method according to the present invention, the reading step includes:

a step of acquiring, by the context management means managing the user context, the address of the server storing with the attribute information by accessing the domain name system server, from the identifier of the attribute information stored in the electronic tag;

a step of acquiring, by the context management means managing the context, the attribute information from the server on the basis of the acquired address.

Further, in the network/service control method according to the present invention, the electronic tag stores the identifying information, a network address of the server storing the attribute information or a network address of the identifying information/network address resolution server that should be accessed for acquiring the network address of the server.

Further, in the network/service control method according to the present invention, the step of acquiring the user context includes:

a step of acquiring, by the context management means managing the context, information about a relation between the user and the object that are stored in an object-to-user relation management database, and the attribute information of the object that is stored in an object/attribute management database existing independently of the object-to-user relation management data, and managing the environment surrounding the user like near-by peripheral as the user context from the user, the object and the attribute information thereof.

Further, in the network/service control method according to the present invention, the step of acquiring the user context includes:

a step of storing, by the context management means managing the context, one database with the identifying information of the object attached with the electronic tag and the attribute information thereof that are read by a user with a reader, and managing the environment surrounding the user like near-by peripheral as the user context from the user, the object and the attribute information thereof.

Further, in the network/service control method according to the present invention, the step of acquiring the user context includes a step of requesting and managing, by the context management means managing the context, the attribute information of the object as the user context when a reader reads the information from the electronic tag.

Further, in the network/service control method according to the present invention, the step of acquiring the user context includes a step of requesting and managing, by the context management means managing the context, the attribute information of the object as the user context at predetermined time.

Further, in the network/service control method according to the present invention, the predetermined time is time when the service is requested.

Further, in the network/service control method according to the present invention, the predetermined time is time when the object attribute specified in the user context gets coincident with the object attribute registered as a pre-notified condition.

Further, the network/service control method according to the present invention further comprises, when allocating network resources satisfying the request condition determined by context-aware service control means that determines the network requirements, a step of changing a medium of information to be transmitted by network control means that allocates the network resources.

Further, the network/service control method according to the present invention further comprises, when allocating network resources satisfying the request condition determined by context-aware service control means that determines the network requirements, a step of changing a coding method of coding information to be transmitted by network control means that allocates the network resources.

EFFECTS OF THE INVENTION

Thus, according to the present invention, the NW and the service are controlled by making use of the user context representing a state (context) of the user, and it is therefore possible to provide the service that is highly convenient to a user. Moreover, the user can receive the information in a mode and a format that are previously designated by the user corresponding to a place and user's belongings.

To be specific, on the occasion of providing a communication service, network requirements are determined by taking account of a user context, a user's favorite and recommendation of a service provider, and intentions of the user, a network operator and the service provider are reflected by dynamically allocating network resources in a way that takes an operation policy of the network operator into consideration on the basis of a network context and operating experiences in the past, thereby dynamically optimizing the allocation of the NW resources. Moreover, also on the occasion of allocating the NW resources so as to meet a request of the user, the network can be effectively utilized in the form conforming to the policy of the network operator, and it is feasible to obtain a ripple effect of receiving the service requests from as many users as possible.

Furthermore, according to the present invention, the network requirements are automatically determined. In the conventional technologies, in the case of requesting Quality of Service (which will hereinafter be abbreviated to QoS), the user is required to declare a variety of parameters. The present invention, however, eliminate the necessity of complicated declaration, and provides the optimum QOS corresponding to the place where the user exists and the user's belongings. Namely, on the occasion of such a state that the user himself or herself is hard to designate the request for the NW corresponding to the context, it is possible to obtain an effect enabling the user's request to be automatically found out without the user's designating the request in accordance with the context.

Further, according to the present invention, it is possible to provide the QoS taking account of a recommended value of the service provider. Moreover, the present invention optimally allocates the network resources. Hence, the present invention minimizes call blocking by effectively utilizing the network resources.

Moreover, according to the present invention, if a condition recommended by the service provider has a discrepancy from a condition drawn from a user profile, the network requirements are set conforming to a relaxed condition. Alternatively, according to the present invention, the network requirements are relaxed when the call blocking occurs. With this process, the present invention enables the call blocking to be minimized. Namely, according to the present invention, it is possible to minimize occurrence of an opportunity loss due to the call blocking for the service provider's sake and the network operator's sake as well. Further, according to the present invention, the user gets an increased possibility of accepting the services, and hence it can be said that high availability to the user is realized.

BRIEF DESCRIPTION OF THE DRAWINGS

FIG. 4 is a conceptual diagram of one example of a user profile used in one embodiment of the network/service control system of the present invention.

FIG. 5 is a conceptual diagram of one example of a user context used in one embodiment of the network/service control system of the present invention.

FIG. 6 is a conceptual diagram of one example of a service profile used in one embodiment of the network/service control system of the present invention.

FIG. 7 is a conceptual diagram of one example of a network context used in one embodiment of the network/service control system of the present invention.

FIG. 21 is a conceptual diagram of a DB (database) employed by an attribute information management system in one embodiment of the network/service control system of the present invention.

FIG. 22 is a conceptual diagram of the DB employed by the attribute information management system in one embodiment of the network/service control system of the present invention.

Figure 1:
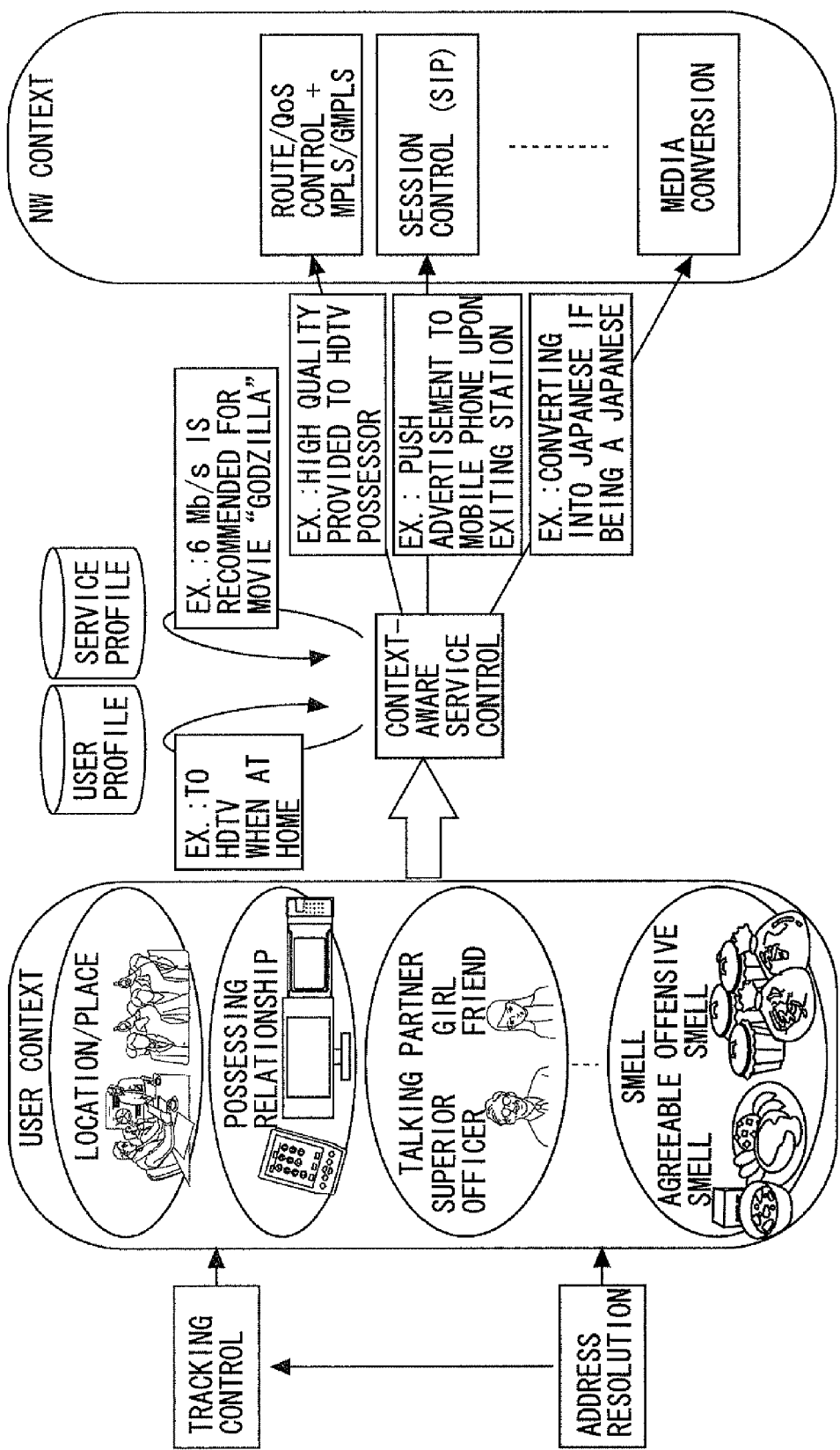
FIG. 1 is a conceptual diagram of one embodiment of the network/service control system of the present invention.

DESCRIPTION OF THE REFERENCE
NUMERALS AND SYMBOLS 201 content server
202 NW control server
203 service control server
204, 205 user terminal
206 distribution-dedicated content DB
207 NW operation policy DB
208 NW context DB
209 user context DB
210 user profile DB
211 service profile DB
212 NW context sensing/management unit
213 NW control unit
214 user context sensing/management unit
215 service control unit

DETAILED DESCRIPTION OF THE INVENTION

One embodiment of a network/service control system of the present invention will be described with reference to FIG. 1. FIG. 1 is a conceptual diagram of one embodiment of the network/service control system of the present invention.

As shown in FIG. 1, one embodiment of the network/service control system of the present invention is that NW resource allocation is dynamically optimized by use of a user context, a user profile, a service profile, a network context and an operation policy of a network operator (the network will hereinafter be abbreviated to NW as the case may be) on the occasion of providing services. With this optimization, the network/service control system of the present invention schemes to provide services in which to reflect a policy of the NW operator and a policy of a service provider who distributes contents and to effectively utilize the NW resources in a way that reflects an intention of a user therein. For instance, if the NW operator aims at effectively utilizing the NW resources, it is feasible to satisfy QoS (Quality of Service) matching with a state (context) of a user and to effectively utilize the NW resources.

Figure 2:
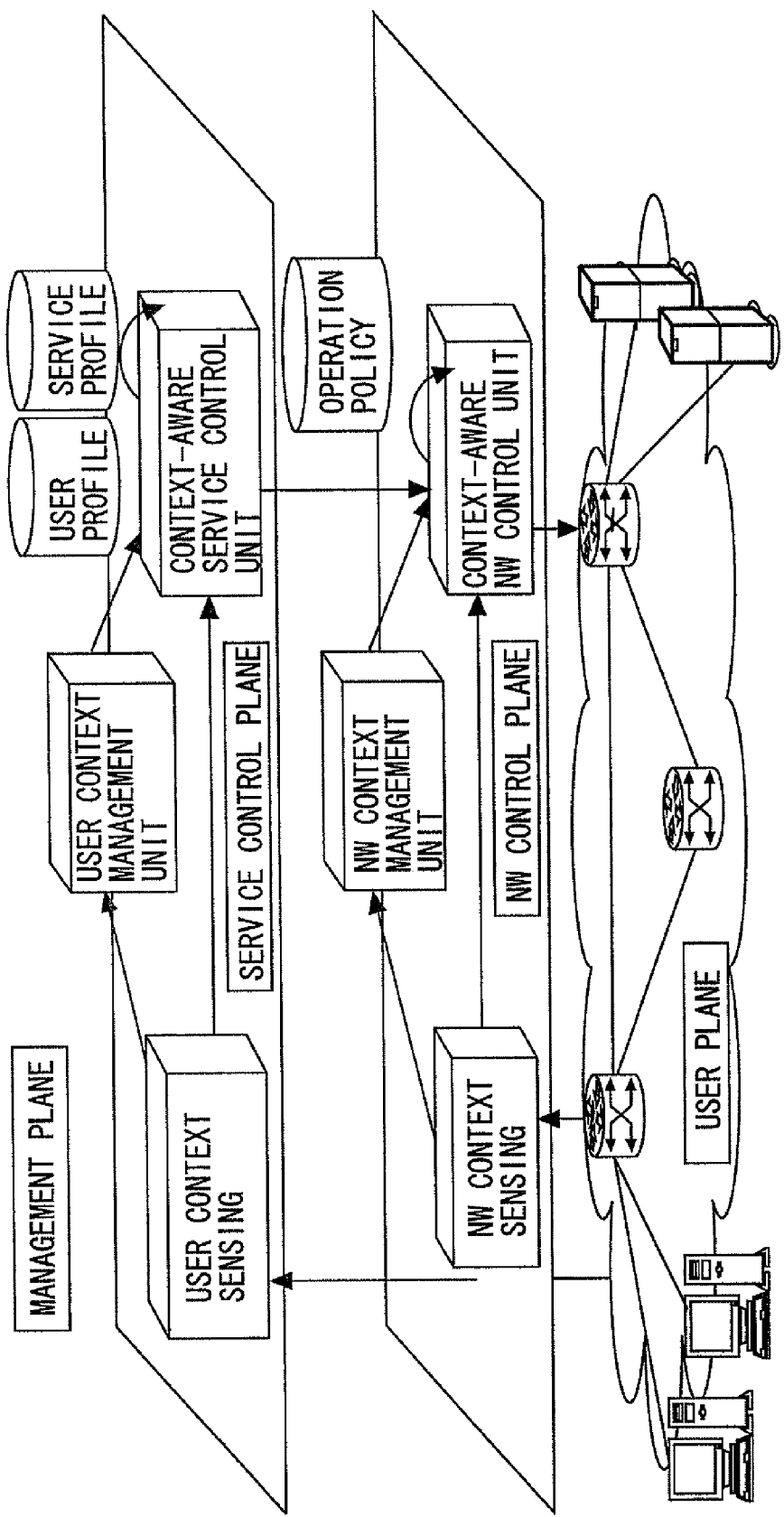
FIG. 2 is a conceptual diagram of a network architecture in one embodiment of the network/service control system of the present invention.

Next, a network architecture of one embodiment of the network/service control system of the present invention will be described with reference to FIG. 2. FIG. 2 is a conceptual diagram of the network architecture of one embodiment of the network/service control system of the present invention.

As shown in FIG. 2, the network architecture of one embodiment of the present system includes two control planes such as NW control and service control. The term "plane" represents a unit for distinguishing between network functions. Then, the two control planes such as the NW control and the service control respectively perform sensing. The term "sensing" connotes perceiving (sensing) an intention and a tendency by observing and surveying a context in order to establish a hypothesis about some context.

The service control plane manages the user context. The user context is used for establishing a hypothesis about the intention of the user, and represents knowledge information drawn from a user's place, user's belongings, a peripheral context of the user, and past behavior pattern of the user. The service control plane determines, based on the user context, a request condition with respect to the NW by referring to information stored in the user profile defined as information to be registered at arbitrary timing by the user about a desire for an information providing mode when the information is distributed to the user, and to information stored in the service profile defined as information to be registered by an information provider about a recommended value of the information providing mode of the information to be distributed. Then, the service control plane notifies the NW control plane of the determined request condition.

The NW control plane manages the NW context. The NW context is used for establishing a hypothesis about a behavior of the NW, and represents knowledge information drawn from contexts such as present traffic and NW performance and from an operation status. The NW control plane dynamically automatically allocates the resources on the basis of the received request condition, the NW context and the operation policy of the NW. The request condition of which to notify the NW control plane can be exemplified such as a condition that, e.g., a video X be transmitted at 6 Mbps to a mobile terminal of a user A. The operation policy can be exemplified such as keeping, e.g., a QoS level of the network at a predetermined level, scheming to uniformize loads of the whole network and utilizing the resources at the maximum.

The operation policy can be considered as a strategy of the network operator. Accordingly, for example, such an operation poly may be set up that [a larger bandwidth be used for enabling the highest quality to be provided], and the network operator may also be enabled to properly set up whatever operation policy.

Thus, in one embodiment of the present system, it is possible to execute the NW control and the service control that simultaneously satisfies the request of the user, the request of the service provider and the request of the network operator owing to the network architecture illustrated in FIG. 2.

Figure 3:
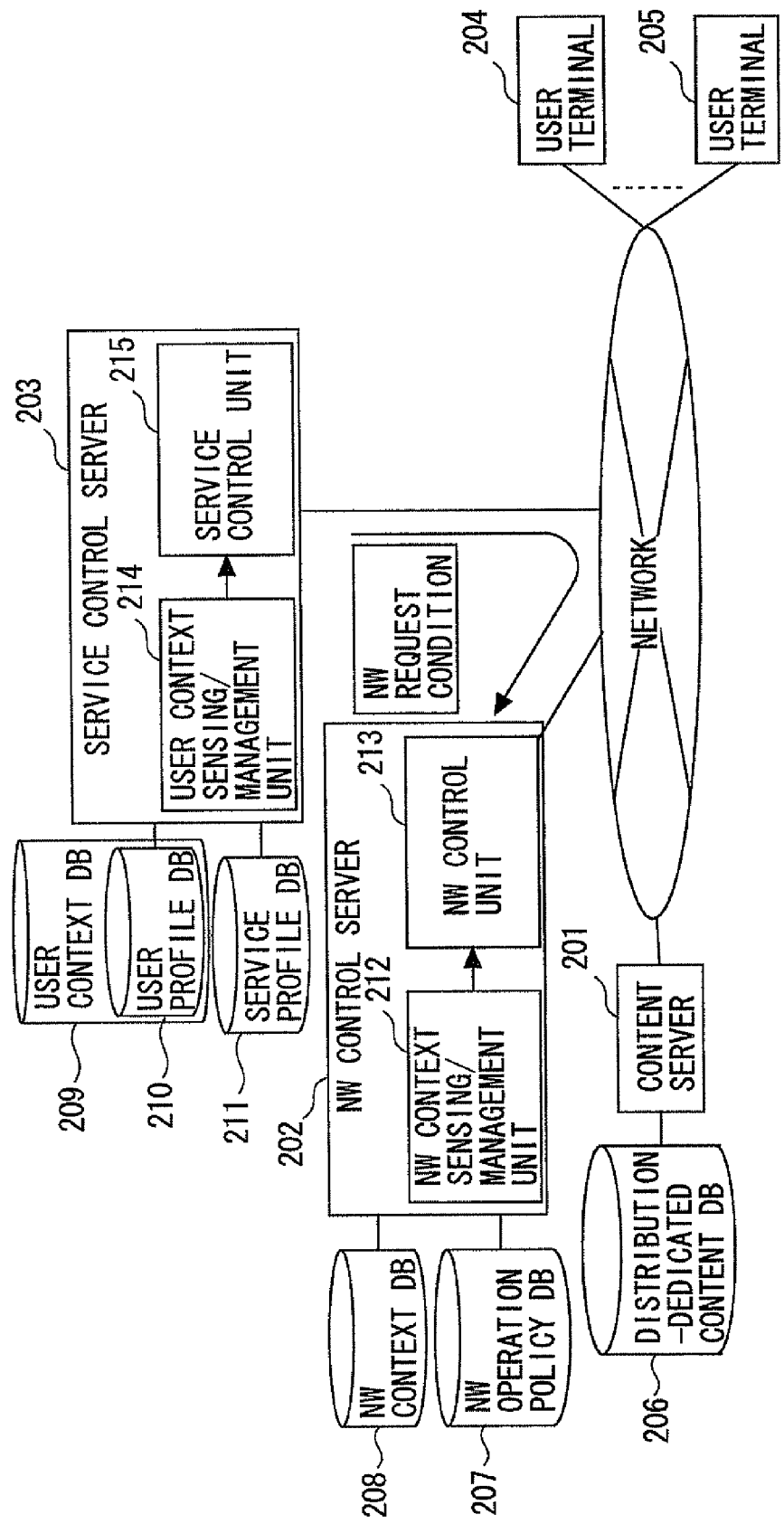
FIG. 3 is a diagram of a configuration in one embodiment of the network/service control system of the present invention.

Next, a configuration of one embodiment of the network/service control system of the present invention will be described with reference to FIG. 3. FIG. 3 is a diagram of the configuration of one embodiment of the network/service control system of the present invention.

As shown in FIG. 3, one embodiment of the network/service control system of the present invention has a configuration including a content server 201, a NW control server 202, a service control server 203 and at least one or more user terminals 204, 205. The content server 201, the NW control server 202, the service control server 203 and at least one or more user terminals 204, 205 are connected to each other via the network.

The content server 201 transmits the content for distribution to the network from a distribution-dedicated content database 206 (which will hereinafter also be abbreviated to DB). The user terminals 204, 205 receive the content distributed by the NW control server 202 from the distribution-dedicated content database 206 of the content server 201.

The NW control server 202 is connected to a NW context DOB 208 storing the NW context, a NW operation policy DB 207 storing the NW operation policy. The NW control server 202 includes a NW context sensing/management unit 212 and a NW control unit 213.

The NW context sensing/management unit 212 collects pieces of information about a NW context and a NW tendency. The information about the NW context is information on the present NW context such as a load state of each router and a traffic state of a line. Further, the information about the NW tendency is information on a context predicted based on the past operation status of the NW such as the information that a specified router has a high load during the forenoon on a weekday. Then, the NW context sensing/management unit 212 manages these collected pieces of information as the NW context. Moreover, the NW context sensing/management unit 212 updates the collected information. The NW operation policy DB 207 stores information representing a policy about the operation of the NW properly registered from the NW operator.

The NW control unit 213 dynamically optimizes the NW resource allocation on the basis of the NW request condition transmitted from the service control server 203, the NW context containing the NW context and the NW tendency that are transmitted from the NW context sensing/management unit 212 and the operation policy referred from the NW operation policy DB 207. For instance, the NW control unit 213 determines an optimum route and distributes the content via this route.

The service control server 203 includes a user context sensing/management unit 214 and a service control unit 215. Further, the service control server 203 is connected to a user context PB 209 and a service profile PB 211. The user context DB 209 includes a user profile DB 210.

The user context sensing/management unit 214 collects pieces of information about the user peripheral context. The user peripheral context includes the location and the place of the user, a possessing relationship between the user and an article, and a talking partner with the user. As a matter of course, the user peripheral context may include information other than these items of information.

Then, the user context sensing/management unit 214 manages the collected pieces of information as the user context, and updates the information. Further, the user context sensing/management unit 214 manages the information registered by the user, i.e., the information about a desire for a providing mode etc when the information is distributed to the user, and updates the information as the user profile. Further, the service control server 203 manages, as the service profile, the information, registered by the information provider, about the recommended value of the information providing mode of the information to be distributed, and updates the information. The service control unit 215 generates the NW request condition based on the user context, the user profile and the service profile.

The user profile, the user context and the service profile will be explained with reference to FIGS. 4, 5 and 6.

FIG. 4 shows a data example of the user profile managed in the user profile DB 210. A computer is recognizable of contents of the user profile on the basis of types and values of parameters registered therein. The example in FIG. 4 is a profile of a user A, wherein if the present location of the user is on the way to a company from the home (on commuting) (condition 1), an entry is that the information should be transmitted at 384 Kbps as a bandwidth of the information distribution in the third row to the mobile terminal serving as an information distributing destination in the second row. The user profile can be properly set up by the user, and a plurality of profiles can be set up corresponding to, e.g., items of information on the present locations of the user.

FIG. 5 shows a data example of the user context managed in the user context DB 209. The example in FIG. 5 is a context of the user A, wherein an entry of the information is that the present location in the first row is in the train, and the terminal in use in the second row is the mobile terminal. The service control server 203 refers to the data in the user context DB 209 and is thereby enabled to determines which data registered in the user profile DB 210 should be referred. For instance, it is recognized from the example in FIG. 5 that the present location of the user A is on the way to the company from the home, and hence the service control server 203 can determine that the data of the condition 1, in which the condition of the location gets coincident with the data of the user context in the plurality of user profiles registered with respect to the user A, should be referred.

FIG. 6 shows a data example of the service profile managed in the service profile DB 211. The computer is recognizable of contents described in the service profile based on types and values of parameters registered therein. In the example in FIG. 6, it is registered as a profile of a content 1 that a name of the content is a movie A, a recommended bandwidth at the distribution time is on the order of 3 Mbps through 6 Mbps, the running time of the content is 130 min, the language is English, and the data in the Japanese version and the data in the English version are subtitle data. The service profile is a profile that can be properly set up by the content provider.

The service control server 203 refers to the data in the service profile DB 211 and is thereby enabled to acquire information showing which distributing condition the content requested by the user to be distributed should be distributed under. FIG. 7 shows a data example of the network context managed in the NW context DB 208. The computer is recognizable of contents described in the service profile on the basis of types and values of parameters registered therein.

The example in FIG. 7 is the first network context, wherein an entry is that a router A should be avoided during a period of 9:00 through 10:00 on the weekday, and information purporting that the traffic gets concentrated is given as a remark. The NW control server 202 refers to these items of information and is thereby enabled to obtain the conditions that should be taken into consideration on the occasion of determining the route when distributing the content.

The data examples shown in FIGS. 4 through 7 are not limited to these contents, and the types of the parameters registered within the data are not limited to those exemplified herein.

Figure 8:
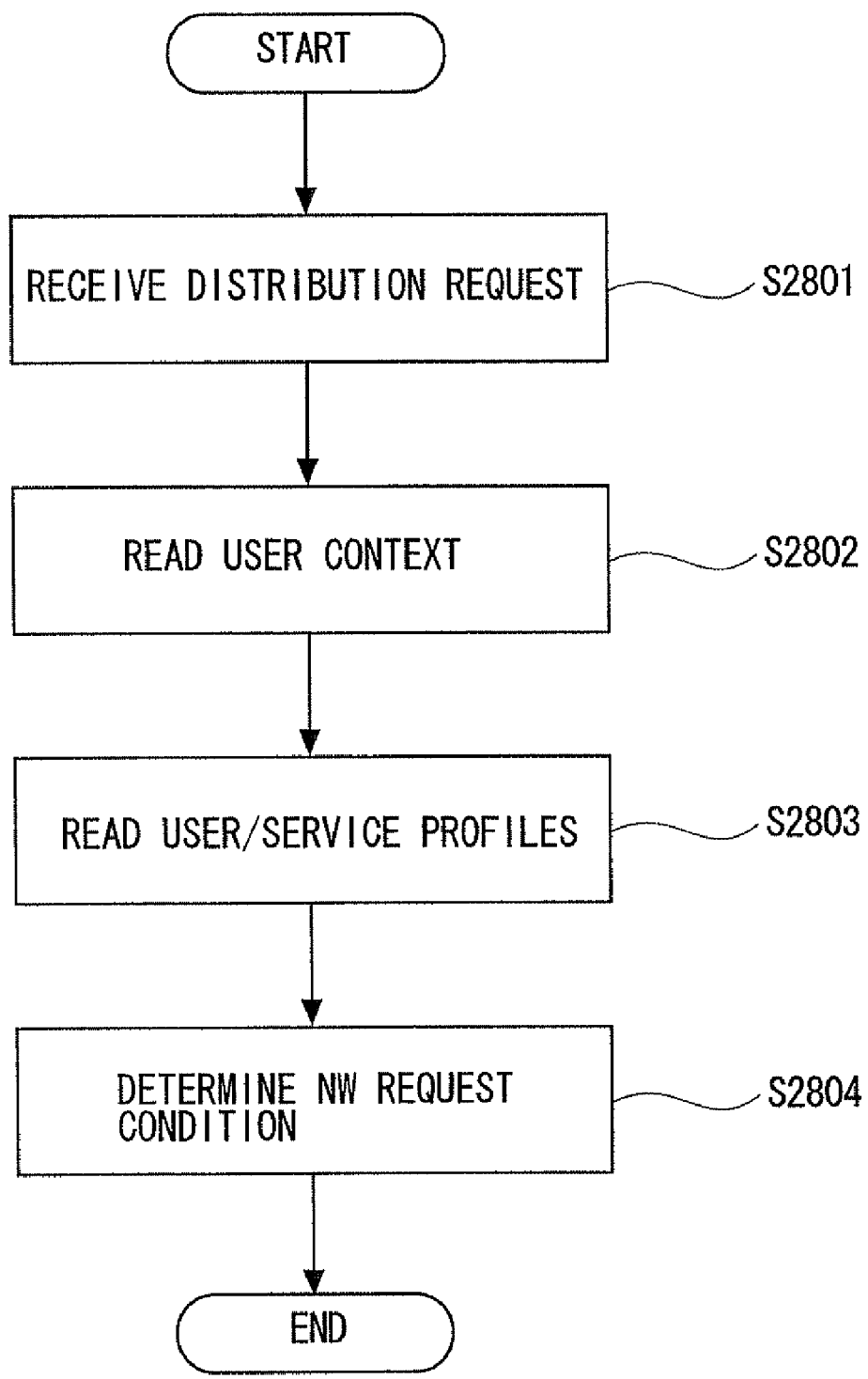
FIG. 8 is a flowchart of an operation of extracting a NW request condition in one embodiment of the network/service control system of the present invention.

Next, in one embodiment of the present system, an operation of the service control server 203 will be described with reference to FIG. 8. FIG. 8 is a flowchart of an operation of extracting the NW request condition in one embodiment of the network/service control system of the present invention. The service control server 203 receives a content distribution request from the user, thereby triggering execution of the processing in this flowchart. Note that the content distribution request from the user may be received directly by the service control server 203 and may also be received via another unillustrated server in FIG. 3. At first, the service control server 203 receives the content distribution request from the user (S2801). In this step, the service control server 203 receives a piece of information for specifying the user together with a piece of information for specifying the should-be-distributed content.

Next, the service control unit 215 of the service control server 203 reads, based on the user-related information acquired in S2801, the context of the user from the user context DB 209 (S2802), and further reads the user profile DB 210 corresponding to contents of the thus-read user context and the service profile DB 211 corresponding to the content information obtained in S2801 (S2803). Then, the service control unit 215 determines the NW request condition on the basis of the items of information that have been read up to S2803 (S2804).

For example, when receiving a distribution request for a movie A from the user A in S2801 and if the user context of the user A, which is referred in S2802, has the contents shown in FIG. 5, it can be determined that the user A is now located on the way to the company from the home, and hence the service control unit 215 reads, in S2803, the user context of the condition 1 in which a value registered in [location] of the parameter type is the same as the value registered in the user context in the profile of the user A illustrated in FIG. 4. Further, the service control unit 215, because of receiving the distribution request for the movie A in S2801, reads the service profile of the content 1 having the same content name as of the content requested to be distributed in the service profile illustrated in FIG. 6.

Then, in S2804, such a NW request condition for distributing the content A is determined based on the contents of the user profile and of the service content that, e.g., the distributing destination is the mobile terminal of the user A, the distribution is done at 384 Kbps in a class A, and the voice conversion into Japanese in the subtitle is conducted.

Further, for instance, when receiving the distribution request for the movie A from the user A in S2801 and when the data showing a purport of being at home is entered as a value of the parameter type [location] in the user context of the user A which has been referred in S2802, it can be determined that the user A is now at home, and therefore the service control unit 215 reads, in S2803, a user context of a condition 2 in which the value entered in the parameter type [location] is the same as the value registered in the user context in the profile of the user A illustrated in FIG. 4. Further, because of receiving the distribution request for the movie A in S2801, and hence the service control unit 215 reads the service profile of the content 1 having the same content name as in the distribution request in the service profile illustrated in FIG. 6.

Then, in S2804, such a NW request condition for distributing the content A is determined based on the contents of the user profile and of the service content that, e.g., the distributing destination is a HDTV (hard disk television) at home of the user A, the distribution is done at 6 Mbps in the class A, and the subtitle is converted into Japanese.

Note that if the parameter types and the values of the data, which are registered in the user profile and in the service profile, are different, it is possible to take a variety of determining methods of how the NW request condition is determined. The determining method will be explained later on.

Figure 9:
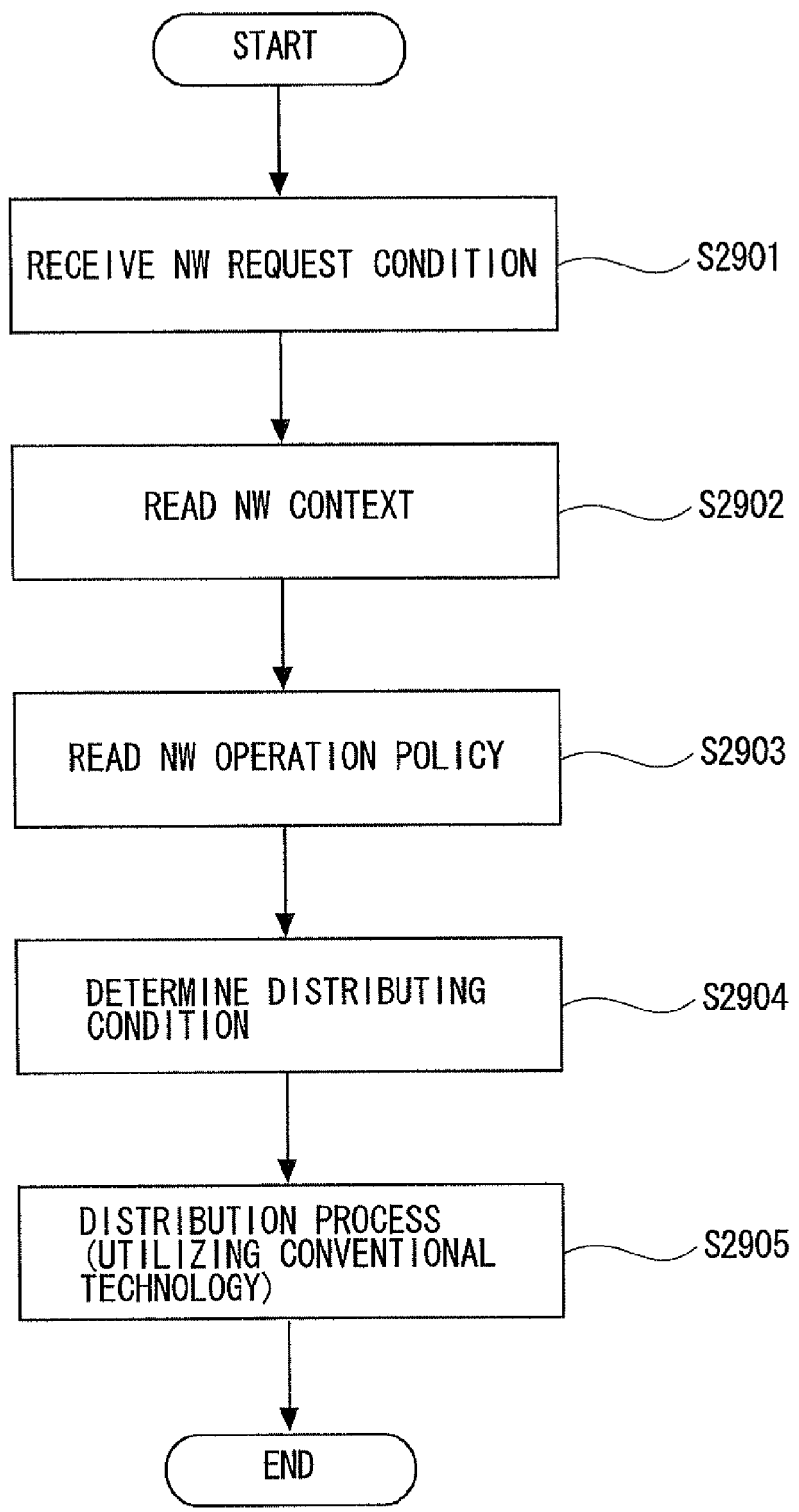
FIG. 9 is a flowchart of an operation of a NW control server in one embodiment of the network/service control system of the present invention.

Next, an operation of the NW control server 202 in one embodiment of the present system will be described with reference to FIG. 9. The NW control server 202 receives the NW request condition from the service control server 203, wherein this reception triggers execution of the processing in this flowchart. To begin with, the NW control server 202 receives the NW request condition from the service control server 203 (S2901). Next, the NW control unit 213 of the NW control server 202 reads, based on the NW request condition received in S2901 the related NW context from the NW context DB 208 (S2902), and further reads the NW operation policy DB 207 (S2903). Then, the NW control unit 213 determines, based on the items of information that have been read up to S2903, the distributing condition such as a route via which and a condition under which the content is actually distributed (S2904), then allocates the network resources on the basis of this distributing condition, and thus distributes the content (S2905).

For instance, in the case of receiving in S2901 the NW request condition showing such a content that [the content A is distributed, wherein the distributing destination is the mobile terminal of the user A, the distribution is done at 384 Kbps in the class A, and the voice in the subtitle is converted into Japanese] and in such a case that the distribution request is received from the user A at 9:30 on a weekday, the NW control unit 213 reads the context shown in the condition 1 in FIG. 7 as the related network context in S2902. It is determined from this content that a distribution route steering clear of the router A should be selected. Then, in S2903, an operation policy such as [the distribution route be determined to uniformize the loads of the whole network] is read from the NW operation policy DB 207.

The NW control unit 213 determines, based on the items of information that have been obtained up to S2903, the distributing condition in S2904 that the content A be distributed to the mobile terminal of the user A via such a route as to uniformize the loads of the whole network in the routes avoiding the router A, wherein the distribution is done at 384 Kbps in the class A, and the voice in the subtitle is converted into Japanese, and performs the distribution in S2905.

Figure 10:
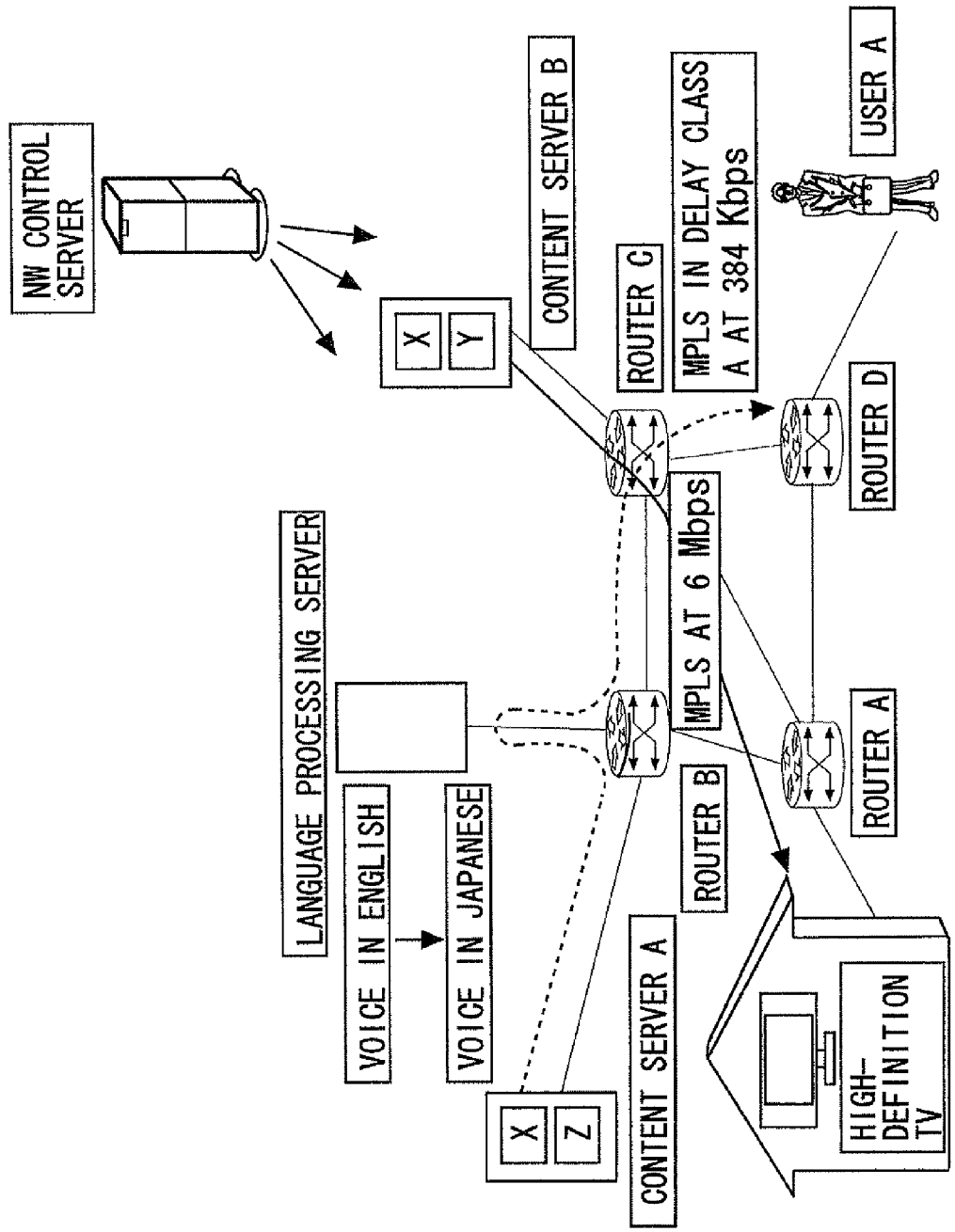
FIG. 10 is a conceptual diagram of NW control in one embodiment of the network/service control system of the present invention.

For example, in the case of distributing the data of the movie A to the mobile terminal of the user A from the content server A managing the data of the movie A in FIG. 10, there are a first route via a router B, a router C and a router D and a second route via the router B, the router A and the router D, however, the condition in the NW context prescribes the avoidance of the router A, and hence the NW control unit 213 determines the first route steering clear of the router A as the distribution route.

Further, for instance, in the case of receiving in S2901 the NW request condition showing such a content that [the content A is distributed, wherein the distributing destination is the HDTV (hard disk TV) at home of the user A, the distribution is done at 6 Mbps in the class A, and the subtitle is converted into Japanese] and in such a case that the distribution request is received from the user A at 19:00 on a holiday, the NW control unit 213 reads the context shown in the condition 2 in FIG. 7 as the related network context in S2902. Note that the distribution request from the user A herein is received at 19:00, however, a period of time expended for distributing the distribution target movie A is 130 min, so that the related network context is read during a period of 19:00 through 21:10 acquired by adding 130 min to 19:00. It is determined from this content that the distribution route avoiding the content server A should be selected. Then, in S2903, the operation policy such as [being distributed via the shortest route] is read from the NW operation policy DB 207.

The NW control unit 213 determines, based on the items of information that have been obtained up to S2903, the distributing condition in S2904 that the content A be distributed to the HDTV of the user A via such a route as to uniformize the loads of the whole network in the routes avoiding the router A, wherein the distribution is done at 6 Mbps in the class A, and the subtitle is converted into Japanese, and performs the distribution in S2905.

For instance, if the data of the movie A is managed by both of the content server A and the content server B in FIG. 10 and if the content is distributed to the HDTV of the user A, there are a first route via the router B and the router A from the server A and a second route via the router C and the router A from the server B, however, a condition in the NW context prescribes the avoidance of the content server A, and hence the NW control unit 213 determines the second route steering clear of the content server A as the distribution route. FIG. 10 is a conceptual diagram of the NW control in one embodiment of the network/service control system of the present invention.

It is to be noted that when the NW control unit 213 allocates the NW resources to meet the NW request condition determined by the service control server 203, it is feasible to convert a coding method into an optimal coding method such as converting the media as converted into the text from the voice and converting MPEG-2 (Moving Picture Experts Group-2) into MPEG-1, and to translate the language such as translating English into Japanese. These conversions and translation are conducted to conform with the received condition as the NW request condition and can be performed by applying a conventional technology.

Moreover, the distributing process executed in S2905 according to the distributing condition determined in S2904 and the network control method can be carried out by employing the conventional technology. The conventional technology is exemplified by the route/QoS control that utilizes, e.g., the traffic engineering.

Incidentally, the route/QoS control utilizing the traffic engineering described in Patent documents 2, 3 and Non-Patent document 4 given above takes account of only the present contexts of the network and the server, however, the network context according to the present invention can be, without being restricted to this example, given as a context pertaining to a tendency of fluctuations in demand as illustrated in FIG. 7. Demand fluctuation patterns according to the seasons, the days of the week and time zones, demand fluctuations about events such as scheduled video distribution as by the TV and information about a network using schedule (session schedule) declared by a user, can be considered as items of the network context, and therefore the content server A can be set in a free status during a period of 20:00 through 22:00 according to, e.g., the context of the condition 2 in FIG. 7, thereby enabling the content server A to provide the service starting at 20:00 in the content sever A without any call blocking of the request.

Further, when it is known that the load on the server having weather information rises if a typhoon gets approaching, and if an access to information other than the weather information is requested as the network context, it is also possible to register a context of selecting none of servers storing the weather information. Thus, the distribution route can be determined in a way that anticipates pre-known network congestion by registering the information on the demand fluctuations in the network context.

On the occasion of providing the best effort service, a quality of communication declines when reaching the congestion time. The NW control server 202 can, however, select the route and the server by anticipating that the traffic gets congested, and hence the network congestion is relaxed. Therefore, the decline of the quality of the best effort service can be prevented.

It should be noted that the example of the network context described above is not definite as in the case of a reservation-based service in which the user or an operator reserves the resources in a certain future time zone but is hypothetical. Then, the demand fluctuation tendency NW context in the present embodiment establishes a hypothesis based on the knowledge acquired from the operations carried out so far.

Moreover, a NW traffic context and a server traffic context at the present can be registered as the network context without being limited to the information on the demand fluctuations.

Another example of the network context is that a traffic behavior taken when a fault and a mis-operation occur is accumulated as the network context, and this network context can be also utilized for detecting the fault and the mis-operation. In this case, such a context is considered that the route is determined in a way that steers clear of occurrence areas of the fault and the mis-operation, or the fault-occurred server is disconnected from the network, or a further monitor for probing an in-depth cause is started up.

Moreover, a relation between strength and an effect of the control in the case of performing the network control, can be also utilized as the network context. For example, there is a case in which if a plurality of routers simultaneously applies load sharing to cope with the congestion detected by the plurality of routers, over-control occurs, and an oscillation phenomenon is caused.

In such an instance when a relation between the strength of the control and a result of the control is registered as the network context and when the control is actually conducted, the over-control can be avoided by performing the control deliberately little by little (weak control) while using this context.

Figure 11:
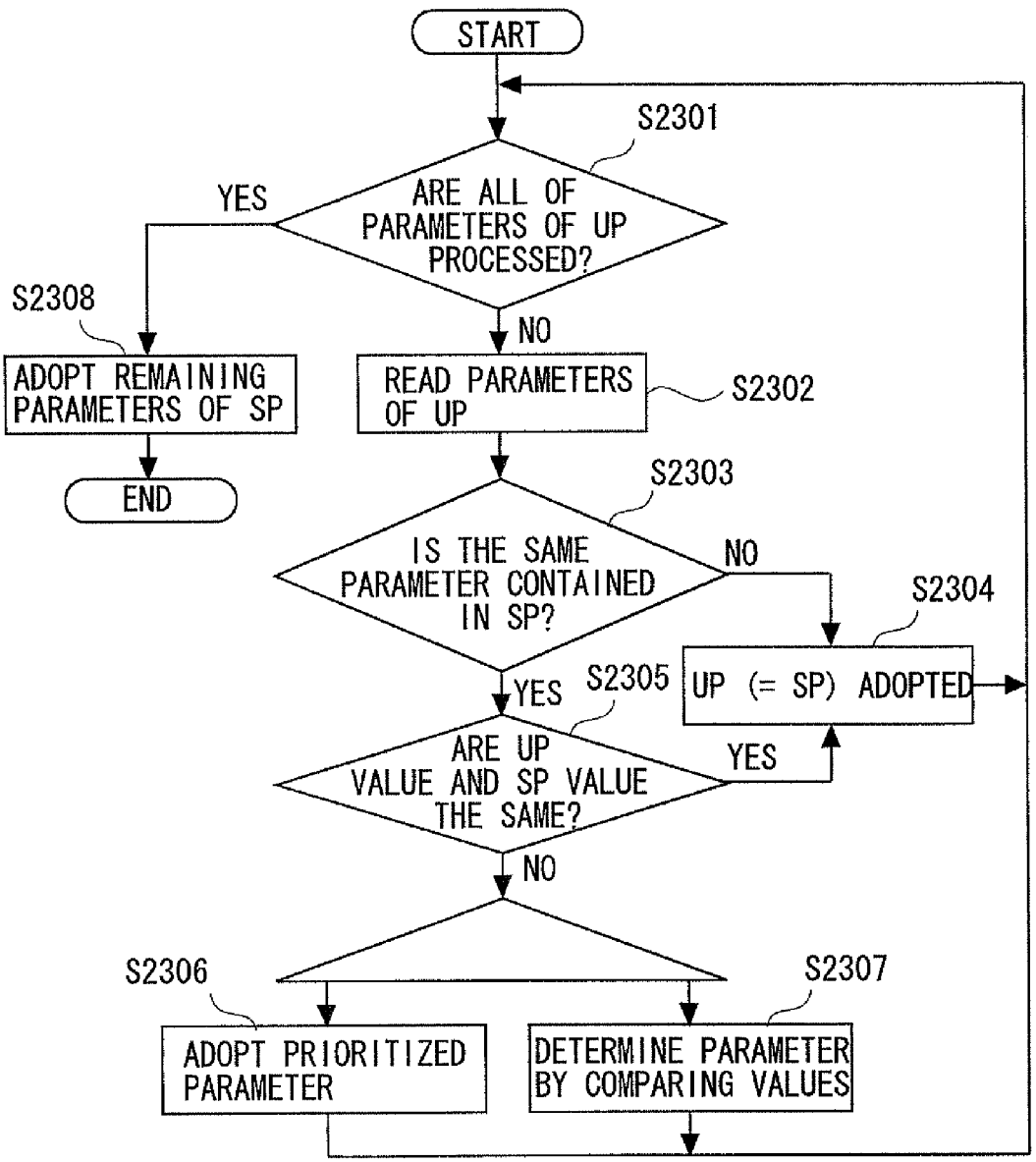
FIG. 11 is a flowchart of an operation of a context-aware service control logic in one embodiment of the network/service control system of the present invention.

Given next is an explanation of a method of determining the NW request condition in a case where the types and the values of the parameters registered in the user profile are different from those registered in the service profile. FIG. 11 is an explanatory diagram of how the service control unit 215 executes a process of determining the NW request condition, which is carried out in S2804 in FIG. 8. The service control unit 215 executes this process based on already-read UP (user profile) data and SP (service profile) data.

If the processing of all of the UP parameters is not finished, one parameter and its value are read from the UP (S2302), and it is determined whether the SP contains the same type of parameter or not (S2303). If the SP does not contain the same parameter (NO), the parameter and its value set in the UP are adopted as the request condition (S2304). Whereas if the SP contains the same parameter (YES), next, it is determined whether the values entered in the parameters are the same with each other or not (S2305). If a result of the determination shows the sameness (YES), UP (=SP) is set as the request condition (S2304) Note that the value entered in the parameter extends to a case of being the value itself, a case of a range and a case of a class such as the bandwidth.

While on the other hand, from the result of the determination in S2305, if the parameter value of the Up is not the same as the parameter value of the SP (NO), it is determined which value of the UP or the SP should be taken in S2306 or S2307. It may be determined properly on the occasion of operating the present system which process in S2306 or S2307 is to be used.

S2306 is a determining method (process) of a priority pre-determination type. The process in S2306 is that a prioritized parameter value of the UP or the SP is adopted as the NW request condition. As to prioritize which one, the UP or the SP, such cases are considered as to prioritize any one of the UP and the SP, to prioritize the UP or the SP having the stricter condition and to prioritize the UP or the SP having the more relaxed condition.

For example, on the occasion of transmitting the video data, if the parameter value related to the UP bandwidth is 3 Mbps and the parameter value related to the SP bandwidth is 6 Mbps, in the case of adopting the stricter in condition, the value "6 Mbps" set in the SP parameter is adopted as the NW request condition. Further, in the case of adopting the more relaxed in condition, the value "3 Mbps" set in the UP parameter is adopted as the request condition.

Moreover, an applied example is that, to begin with, the condition of the stricter request condition being set as the NW request condition, the NW control server 202 performs the distribution based on this NW request condition and, if the call blocking occurs in the distribution, notifies the service control server 203 of a purport that the call blocking has occurred, wherein the service control server 203 receiving this notification changes the NW request condition determining method from the determining method of adopting the stricter in condition described earlier to the determining method of adopting the more relaxed in condition, then resets the NW request condition, and notifies the NW control server 202 of the reset NW request condition, and the NW control server 202 can also re-determine the distributing condition based on the updated NW request condition.

S2307 is a determining method (process) of a content comparative determination type. The process in S2307 is that the NW request condition is determined by comparing the UP parameter value with the SP parameter value. This determining method is a method applied in a case where the contents of the parameters are described not in specified values but in a range. A variety of methods are considered about how the value is adopted by way of the NW request condition as a result of the comparison between the two parameters.

For example, if one parameter is the specified value while the other parameter is the value defining the range, and if the specified value is within the range, this specified value can be also set as the NW request condition. Further, if the specified value does not fall within the range, an in-range value most approximate to this specified value, i.e., a maximum value or a minimum value within the range, can be set as the NW request condition. For example, in the condition 1 of the user profile in FIG. 4, [384 Kbps] is set as the parameter of the bandwidth, and [3-6 Mbps] is set as the parameter of the bandwidth in the content 1 of the service profile in FIG. 6. According to this determination method, [3 Mbps] of 3 Mbps through 6 Mbps, which is most approximate to 384 Kbps, is adopted as the parameter value of the bandwidth.

Moreover, for instance, if one parameter is the specified value while the other parameter is the value indicating the range, the specified value may also be set unconditionally as the NW request condition. Further, by contrast with this case, the value indicating the range may also be set unconditionally as the NW request condition.

Still further, if both of the parameters specify only the ranges but do not show the specified values, and if there is an area of being overlapped in their ranges, this overlapped area can be set as the NW request condition. If the values indicating the ranges are not overlapped, only the value of one of the profiles can be also set as the NW request condition by any one of the methods described earlier. Moreover, even when any one or both of the parameter values is or are the value(s) indicating the range(s), one parameter value may be prioritized not by the method in S2307 but by the method in S2306. Further, if the same parameter type does not exist in both of the parameters, the respective parameter types of the two parameters, i.e., a sum-set of the two parameters can be also set as the NW request condition.

Incidentally, the description about how the NW request condition is determined if the parameter types and the parameter values of the two profiles are different from each other, has been made with reference to FIG. 11, however, it may not cause any inconvenience to determine the NW request condition by a method other than those described herein if the NW request condition is determined by use of the data registered in the two profiles. For instance, when the parameters of the bandwidth and the delay class are set in the user profile and when the parameters of the packet loss rate and the delay class are set in the service profile, the three parameters of the bandwidth, the packet loss rate and the delay class, i.e., a sum-set of the parameters in the two profiles may also be set as the NW request condition, further the delay class parameters, i.e., a product-set of the parameters in the two profiles may also be set as the NW request condition, and any one parameter such as only the bandwidth parameter or only the packet loss rate parameter may also be set as the NW request condition.

As described above, according to the present embodiment, with the architecture shown in FIG. 3, when distributing a certain content to the user, the service control server 203 determines the NW request condition based on the user context representing the items of information such as the present location of the user, the place where the user exists and the terminal possessed by the user, the user profile representing the items of information such as a favorite of the user about the content providing method, and the service profile set with respect to the content. Then, the NW control server 202 determines, based on the NW request condition, the NW context and the NW operation policy, the route so that the allocation of the NW resources gets most effective.

It should be noted that the system architecture for carrying out the present invention may not be the architecture illustrated in FIG. 3. For example, the user context sensing/management unit 214 may be provided not on the service control server 203 but on another server. The description of the basic operation of the present invention has been done so far.

Figure 12:
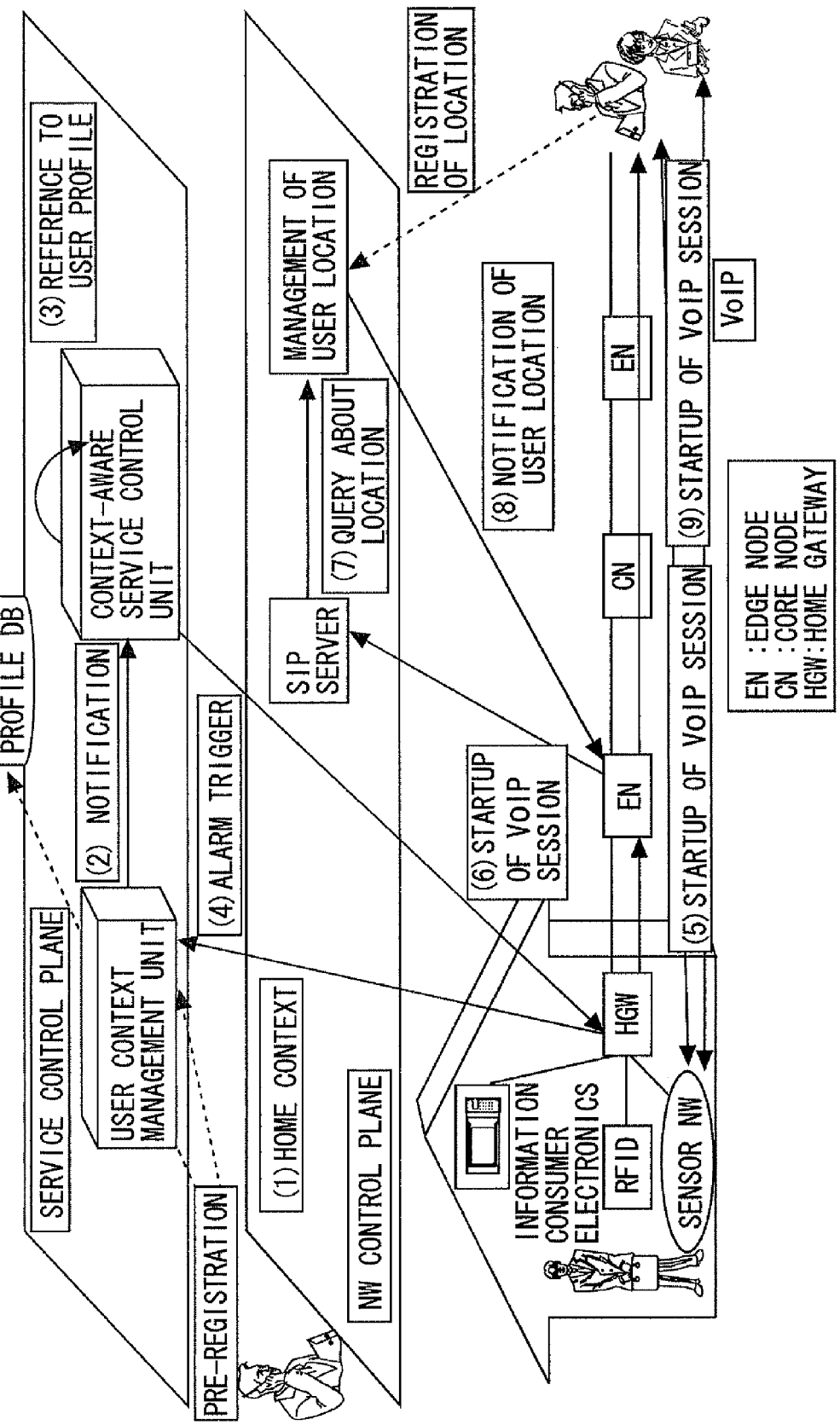
FIG. 12 is a conceptual diagram of context-aware home security given by way of a second example of the service provided in one embodiment of the network/service control system of the present invention.

Next, a second example of one embodiment of the network/service control system of the present invention will be explained. The first example is that the operation of the present system is triggered by receiving the content request from the user, however, the second example is that the present system operates corresponding to a context sensed by the system. Further, in the first example, the service control unit 215 determines the NW request condition by respectively referring to the user context and the user profile as the user-related information and to the service profile as the content-related information, however, in the second example, the NW request condition is determined only from the user context and the user profile. FIG. 12 is a conceptual diagram of the second example in which the present invention is applied to home security.

A home security service in the second example is a service for notifying, in case a thief trespasses from outside, the residents and the police of this trespass. The second example has a scheme of previously registering, as the user context, information about the present location of the user and information about whether a figure exists in the user's residence or not, and further, as the user profile, information having a content of notifying, if the present location of the user is other than the residence and when detecting that the figure trespasses on the residence, the residents and the police of this purport.

Then, in the case of actual occurrence of such a context that the thief etc trespasses on the residence, the user context sensing/management unit 214 updates the contents of the user context DB 209, and notifies the service control unit 215 of the purport of having updated the contents. The service control unit 215 reads the updated user context, and determines the NW request condition according to the information stored in the user profile DB. The NW request condition is exemplified such as starting up the SIP and telephoning the police and the residents.

In the service in the second example, a process other than telephoning is considered corresponding to a change in context of the user content that the figure trespasses on the residence. For example, such an extension of the service is considered that a monitor camera is started up to record an image, and the information of the image captured by the monitor camera streams onto a TV monitor of the police. As described above, in the present embodiment, the service control server 203 determines the NW request condition on the basis of the user profile and the user context.

Figure 13:
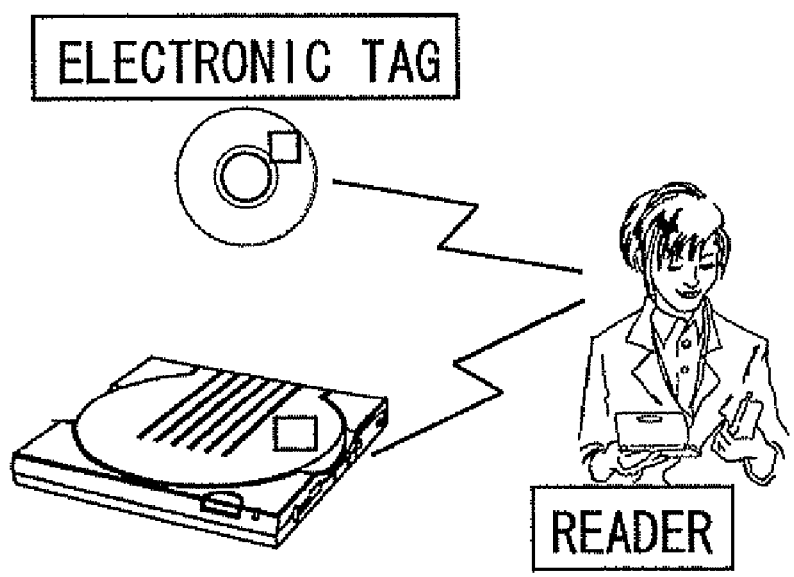
FIG. 13 is a conceptual diagram of a location-and-possessing relation recognizing system in one embodiment of the network/service control system of the present invention.
Figure 14:
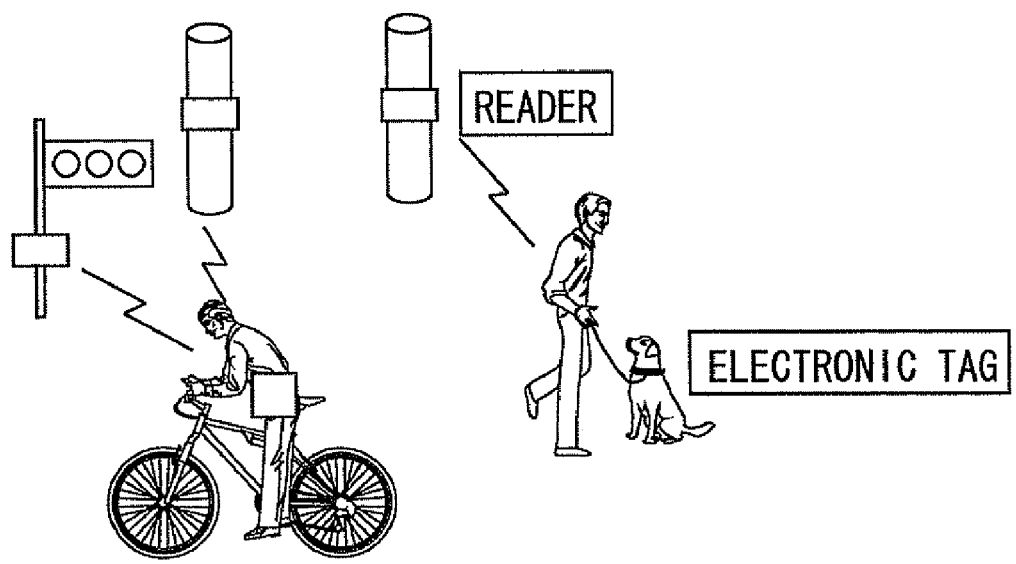
FIG. 14 is a conceptual diagram of the location-and-possessing relation recognizing system in one embodiment of the network/service control system of the present invention.
Figure 15:
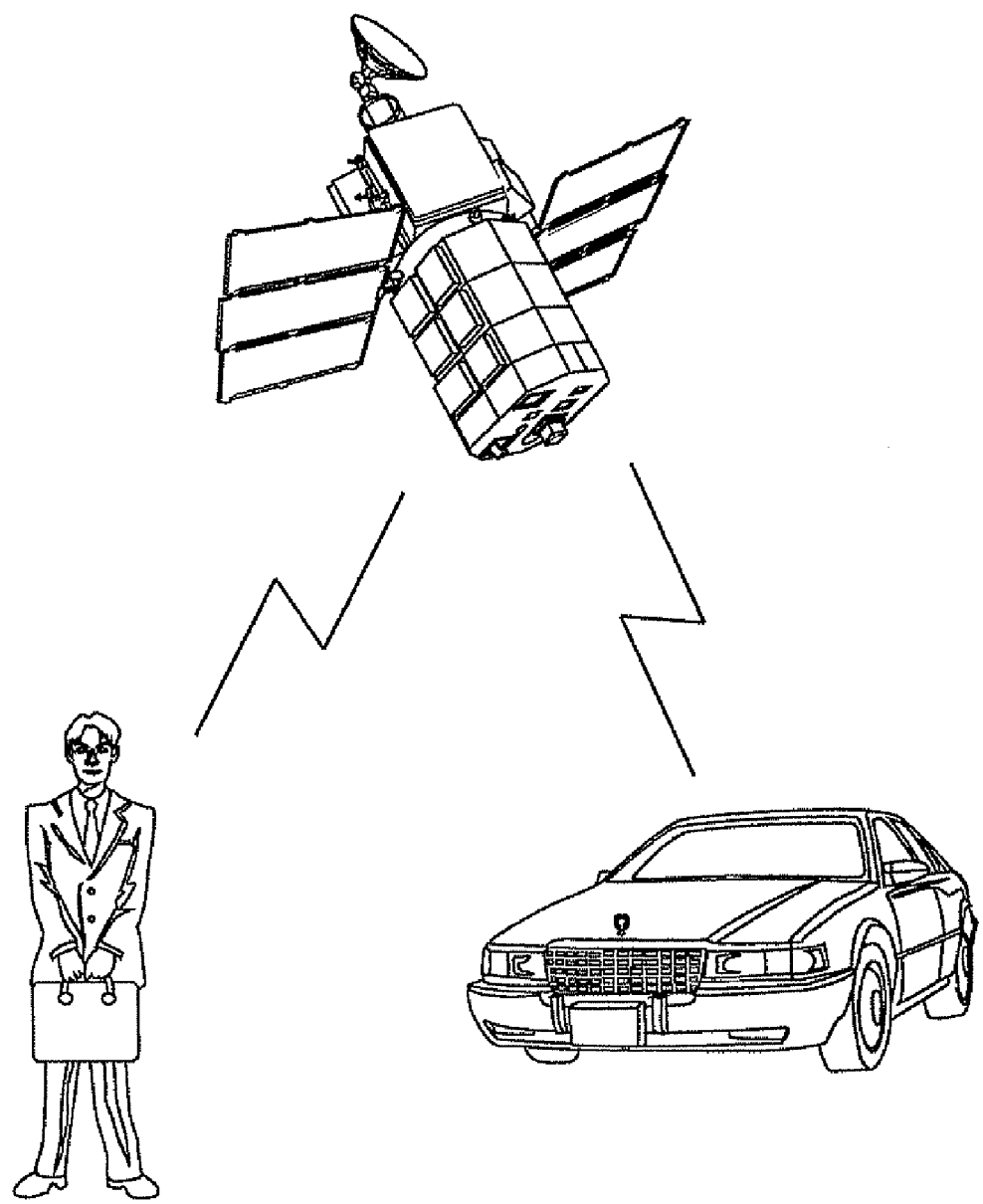
FIG. 15 is a conceptual diagram of the location-and-possessing relation recognizing system in one embodiment of the network/service control system of the present invention.
Figure 16:
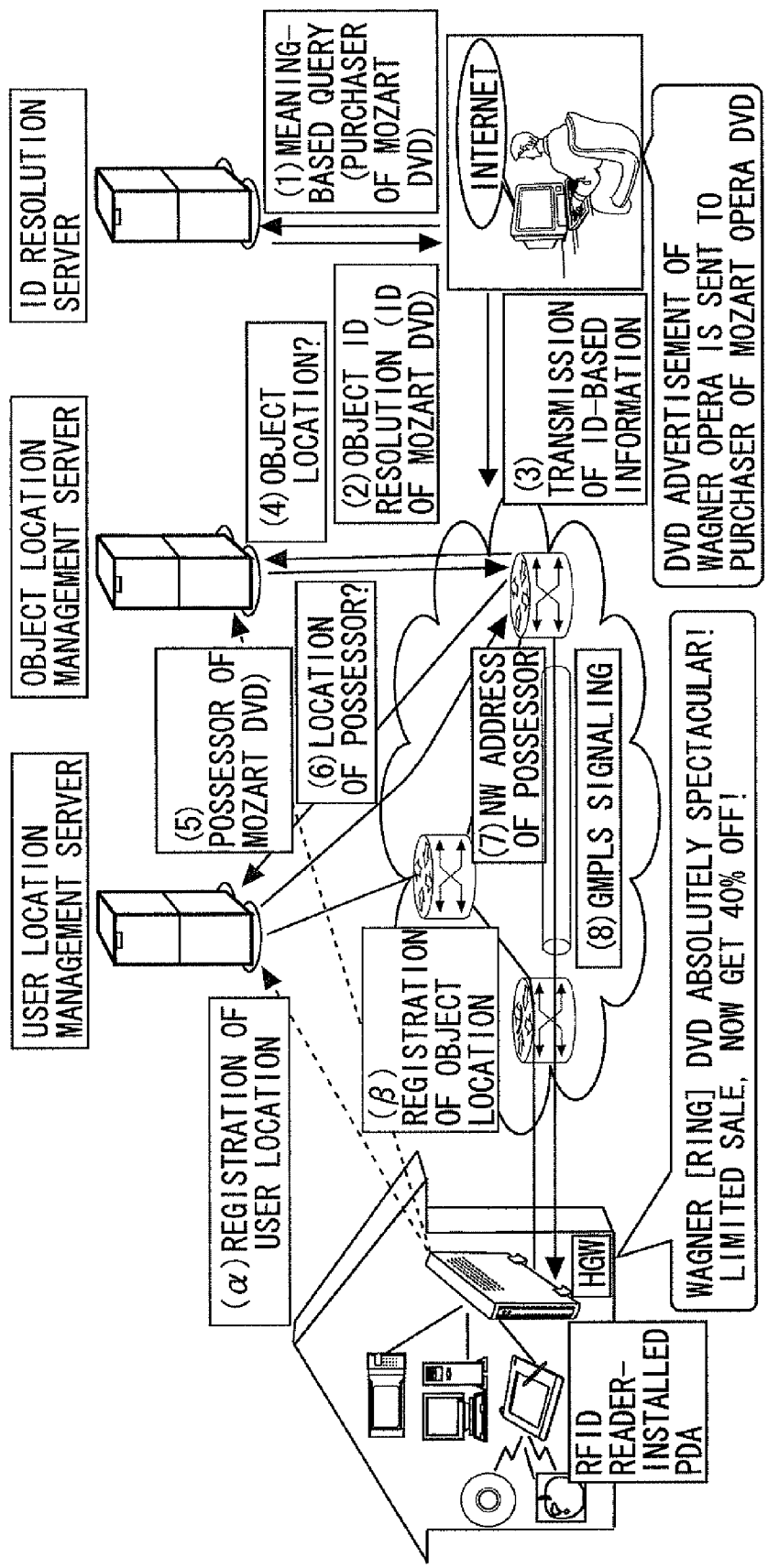
FIG. 16 is a conceptual diagram of an address resolution technology and a tracking control technology in one embodiment of the network/service control system of the present invention.

Next, an applied example of each of the processing units of the network/service control system according to the present invention will be explained. To begin with, a user context collecting method carried out by the user context sensing/management unit 214 will be explained with reference to FIGS. 13 through 16. FIGS. 13, 14 and 15 are conceptual diagrams showing a location-and-possessing relation recognizing system in one embodiment of the network/service control system of the present invention. Further, FIG. 16 is a conceptual diagram showing an address resolution technology and a tracking control technology in one embodiment of the network/service control system of the present invention.

At first, a first example of the location-and-possessing relation recognizing system in one embodiment of the network/service control system of the present invention, will be described with reference to FIG. 13. The example illustrated in FIG. 13 is the location-and-possessing relation recognizing system categorized as a user reading system.

As shown in FIG. 13, in this system, the user carries a mobile phone, a PDA (Personal Digital Assistant), a handheld PC, etc each having a reader function. Then, this user reading system is that electronic tags (Radio Frequency IDentifications: RFIDs) are attached to an object and to a place. Then, the user reading system grasps a logical relation between the object and the possessor.

For instance, the user reading system stores, in a table of the server, an address of the mobile phone and an address of the object embedded with the electronic tag read by the mobile phone in a way that associates these addresses with each other. Hence, in the first example of the location-and-possessing relation recognizing system in one embodiment of the network/service control system of the present invention, the relation between the mobile phone and the object embedded with the electronic tag read by the mobile phone is grasped from this table. This relation can be exemplified by a locating relation between the mobile phone and the electronic tag read by the mobile phone.

Next, a second example of the location-and-possessing relation recognizing system will be described with reference to FIG. 14. The second example is the location-and-possessing relation recognizing system categorized as a reader embedding system.

As shown in FIG. 14, the reader embedding system in the second example involves attaching the electronic tags (RFIDs) to a moving object and a moving person. Then, in the system in the second example, the readers are embedded here and there. The system in the second example then reads signals of the electronic tags with the readers. Then, the system in the second example recognizes that the object and the person pass through the reader-embedded places.

Next, a third example of the location-and-possessing relation recognizing system will be explained with reference to FIG. 15. The third example is of a locating relation recognizing system that utilizes a GPS (Global Positioning System). The system in the third example grasps the locating relation between the person and the object by utilizing the GPS.

Herein, the address resolution technology and the tracking control technology in the present embodiment will be described with reference to FIG. 16. FIG. 16 is a conceptual diagram of the address resolution technology and the tracking control technology in one embodiment of the network/service control system of the present invention.

(α) and (β): To start with, the user receiving the information registers a location of the user and a location of the object in the user location management server.

(1): As illustrated in FIG. 16, the user transmitting the information sends a meaning-based query to an ID resolution server. In the example shown in FIG. 16, the user sends a query about a Mozart DVD purchaser.

(2): Then, the ID resolution server transmits an ID of the Mozart DVD to the user.

(3): Subsequently, the user transmits the information based on the received ID.

(4) and (5): Then, the object location management server makes a response of "possessor" to the query about the location of the object.

(6) and (7): Subsequently, the user location management server makes a response of a NW address of the possessor to the query about the location of the possessor.

(8): Then, through GMPLS (Generalized Multi-Protocol Label Switching) signaling, the information is sent to the user receiving the information from the user transmitting the information.

Next, an attribute information reference system implemented by the user context sensing/management unit 214 of the network/service control system of the present invention will be described with reference to FIGS. 17, 18, 19 and 20. FIGS. 17, 18, 19 and 20 are conceptual diagrams of the attribute information reference system of one embodiment of the network/service control system of the present invention.

Figure 17:
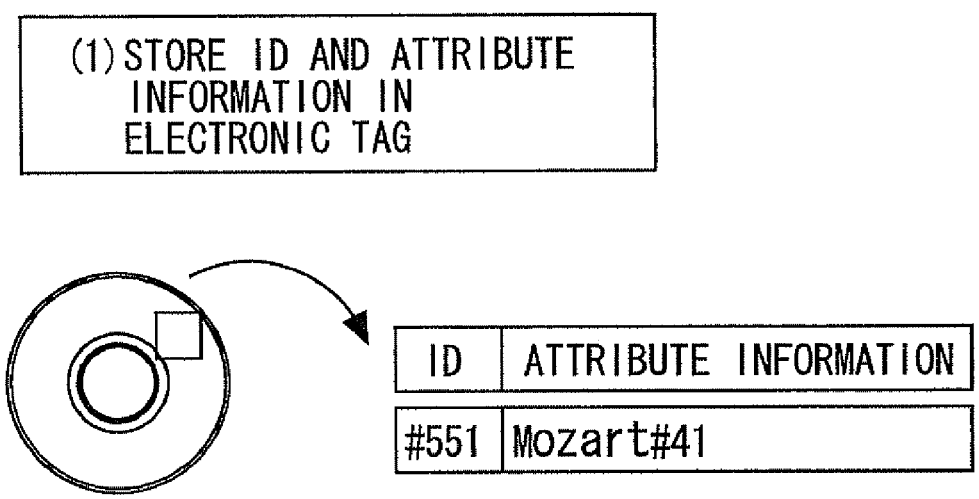
FIG. 17 is a conceptual diagram of an attribute information reference system in one embodiment of the network/service control system of the present invention.

At first, a first system of the attribute information reference system will be explained. As illustrated in FIG. 17, the first system of the attribute information reference system in the present embodiment is a system in which not only the ID but also attribute information is written to the electronic tag in the location-and-possessing relation recognizing system described above.

The attribute information is such information that this place is a meeting room, this device is a PC and so on. In the first system of the attribute information reference system in the present embodiment, an attribute gets known at a point of time when reading a content of the electronic tag. The first system of the attribute information reference system in the present embodiment is a method by which the least load is applied onto the NW. The first system of the attribute information reference system in the present embodiment has, however, a limit in terms of an information quantity (data size) contained in the attribute information.

Figure 18:
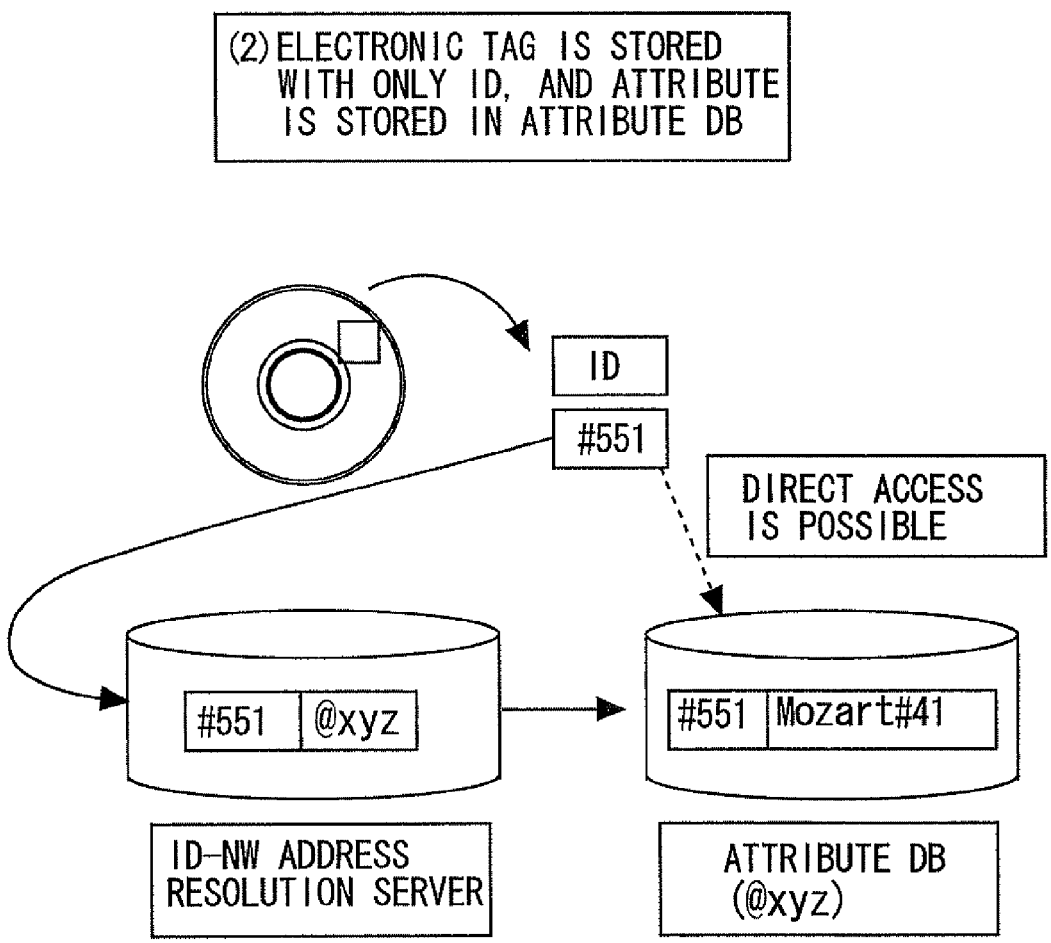
FIG. 18 is a conceptual diagram of the attribute information reference system in one embodiment of the network/service control system of the present invention.

Next, a second system of the attribute information reference system will be described. As illustrated in FIG. 18, the second system of the attribute information reference system in the present embodiment corresponds to a case in which only the ID is written to the electronic tag in the location-and-possessing relation recognizing system described above. Further, in the case of the second system of the attribute information reference system in the present embodiment, the attribute information is stored in the server. The second system of the attribute information reference system in the present embodiment involves reading the attribute information from the server via the network.

Then, the second system of the attribute information reference system in the present embodiment includes a system of accessing directly the server as a system of reading the attribute information from the server.

Further, in the second system of the attribute information reference system in the present embodiment, an ID-NW address resolution server is queried about an address of the server to which the attribute information of the object having a predetermined ID is written. In the second system of the attribute information reference system in the present embodiment, the attribute information is acquired by accessing the server to which the attribute information is written. Moreover, the second system of the attribute information reference system in the present embodiment enables an ID format and an in-depth information format to be defined newly.

Figure 19:
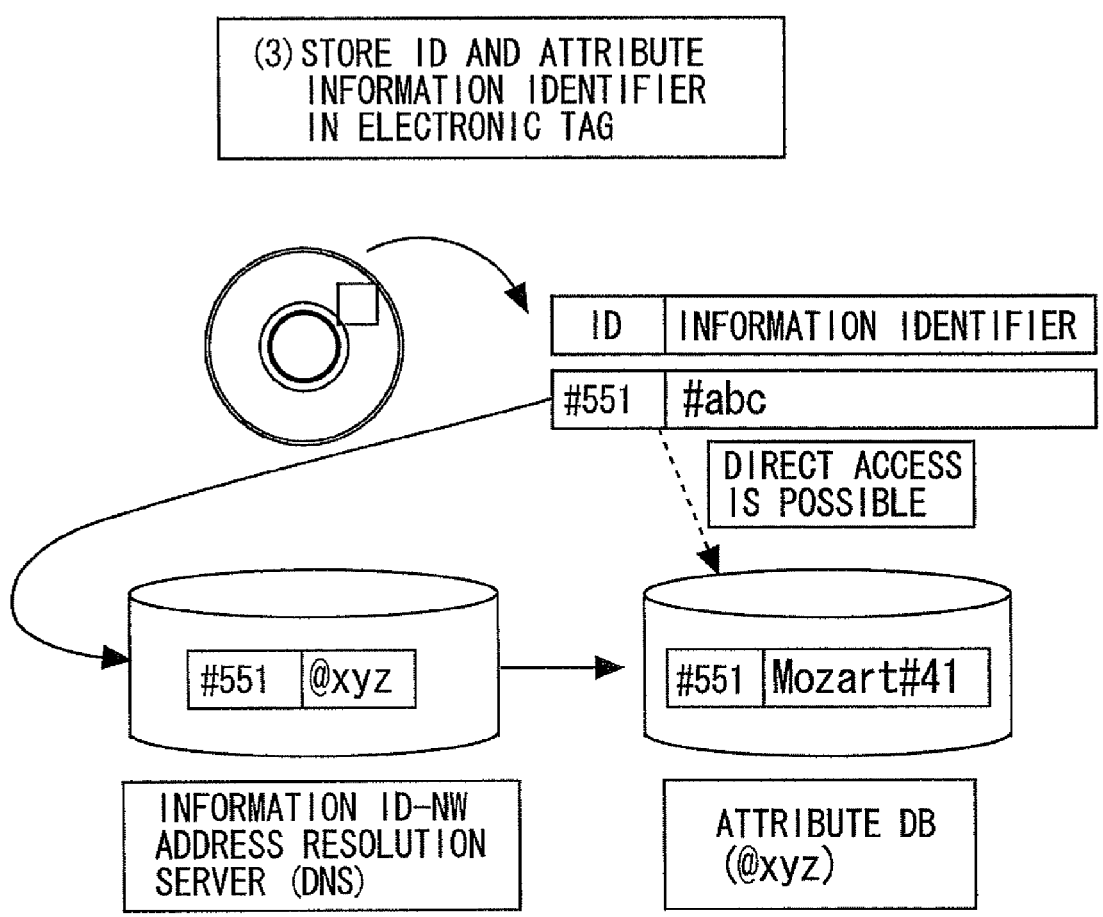
FIG. 19 is a conceptual diagram of the attribute information reference system in one embodiment of the network/service control system of the present invention.

Next, a third system of the attribute information reference system will be descried with reference to FIG. 19. The third system is a first intermediate system of the attribute information reference system between the system illustrated in FIG. 17 and the system shown in FIG. 18 in the location-and-possessing relation recognizing system described above.

In this attribute information reference system, none of the attribute information is stored in the electronic tag. The attribute information reference system in this case is, however, such that the electronic tag stores the ID and an identifier (e.g., URL (Uniform Resource Locator)) of the attribute information. Therefore, the third system of the attribute information reference system specifies, based on this URL, an IP address of the server to which the attribute information is written via an existing DNS (Domain Name System).

Then, the third system of the attribute information reference system acquires the attribute information from the server. When the attribute information specified by the ID can be referred by use of the existing URL, the third system of the attribute information reference system exhibits convenience.

Figure 20:
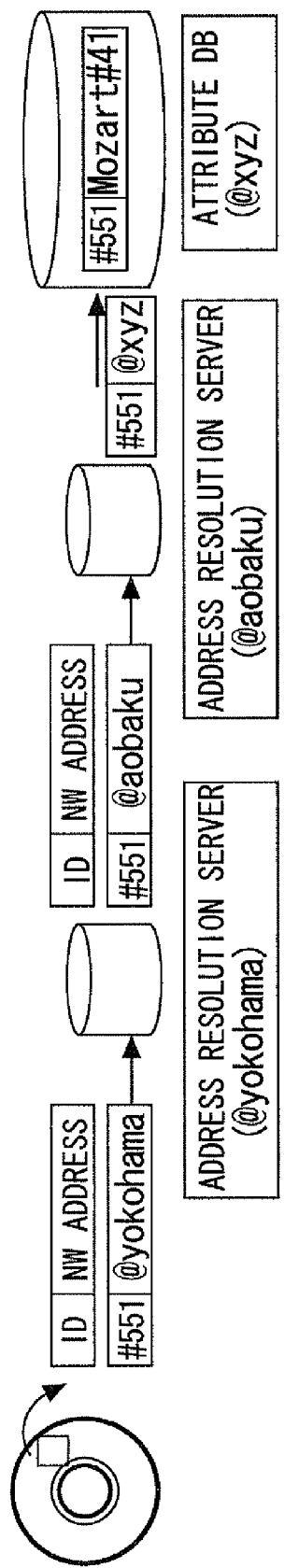
FIG. 20 is a conceptual diagram of the attribute information reference system in one embodiment of the network/service control system of the present invention.

Next, a fourth system of the attribute information reference system will be explained with reference to FIG. 20. The fourth system is a second intermediate system of the attribute information reference system between the system illustrated in FIG. 17 and the system shown in FIG. 18 in the location-and-possessing relation recognizing system described above.

In the fourth system of the attribute information reference system in the present embodiment, the attribute information is not stored in the electronic tag. However, the electronic tag stores the ID and the NW address. The NW address is a NW address such as the IP address of the server containing the attribute information.

Alternatively, in the fourth system of the attribute information reference system in the present embodiment, the information stored in the electronic tag may be the ID and the NW address of the ID-NW address resolution server that should be accessed in order to know the NW address. The electronic tag may also store a NW address of an intermediate server. Further, the items of information stored in the electronic tag may be rewritten in sequence.

Next, a fifth system of the attribute information reference system will be described. The fifth system is a system of grasping directions of the moving person and the moving object from a pass-through history of the readers installed at a plurality of places in the system illustrated in FIG. 14. For instance, a scheme in the present embodiment is that a reader A and a reader B recognize, in the case of sequentially recording the pass-through history, that the person and the object move toward the reader B from the reader A.

Next, a sixth system of the attribute information reference system will be explained. The sixth system is, in the system illustrated in FIG. 14, a system of recognizing that the object and the reader move together from the same motions of the object and the reader, i.e., the system of recognizing a possessing relation or a talker-to-talker relation.

Next, a seventh system of the attribute information reference system will be described. The seventh system is, in the system illustrated in FIG. 14, a system of receiving place-attribute information from the embedded readers.

Next, an eighth system of the attribute information reference system will be described. The eighth system is, in the system illustrated in FIG. 14, a system of receiving only place-identifiers from the embedded readers. Then, the eighth system specifies the place-attributes from the place-identifiers via the network.

Next, a ninth system of the attribute information reference system will be described. The ninth system refers to, in the system shown in FIG. 14, the attributes of the person and the object that carry the electronic tags in the same way as the cases shown in FIGS. 17 through 20.

An attribute information management system implemented by the user context sensing/management unit 214 of the network/service control system of the present invention, will be described with reference to FIGS. 21 and 22. FIGS. 21 and 22 are conceptual diagrams of the DBs (databases) used in the attribute information management system in one embodiment of the network/service control system of the present invention.

To begin with, a first method of the attribute information management system in the present embodiment will be explained with reference to FIG. 21. As illustrated in FIG. 21, in the first method, an RFID (object)/reader (user) relation management DB on the NW control plane and an RFID (object)/attribute management DB on the service control plane, exist independently.

Then, the first method involves querying the RFID (object)/attribute management DB about an attribute of the object related to the user (the object possessed by or located in the very place together with or existing in close proximity to the user) as the necessity may arise. Then, the first method involves acquiring the user context. In this method, it is recognized from the object/user relation management DB that, e.g., a user (masa) is related to an object (#0551). Moreover, it is known from the object/attribute management DB that the object "#0551" is a CD. Then, it is recognized from these relations that the user (#masa) possesses the object, i.e., the CD.

Next, a second method of the attribute information management system in the present embodiment will be explained with reference to FIG. 22. As illustrated in FIG. 22, the second method is that the RFID (object) read by the reader (user) and the attribute thereof are managed by the single DB.

Figure 23:
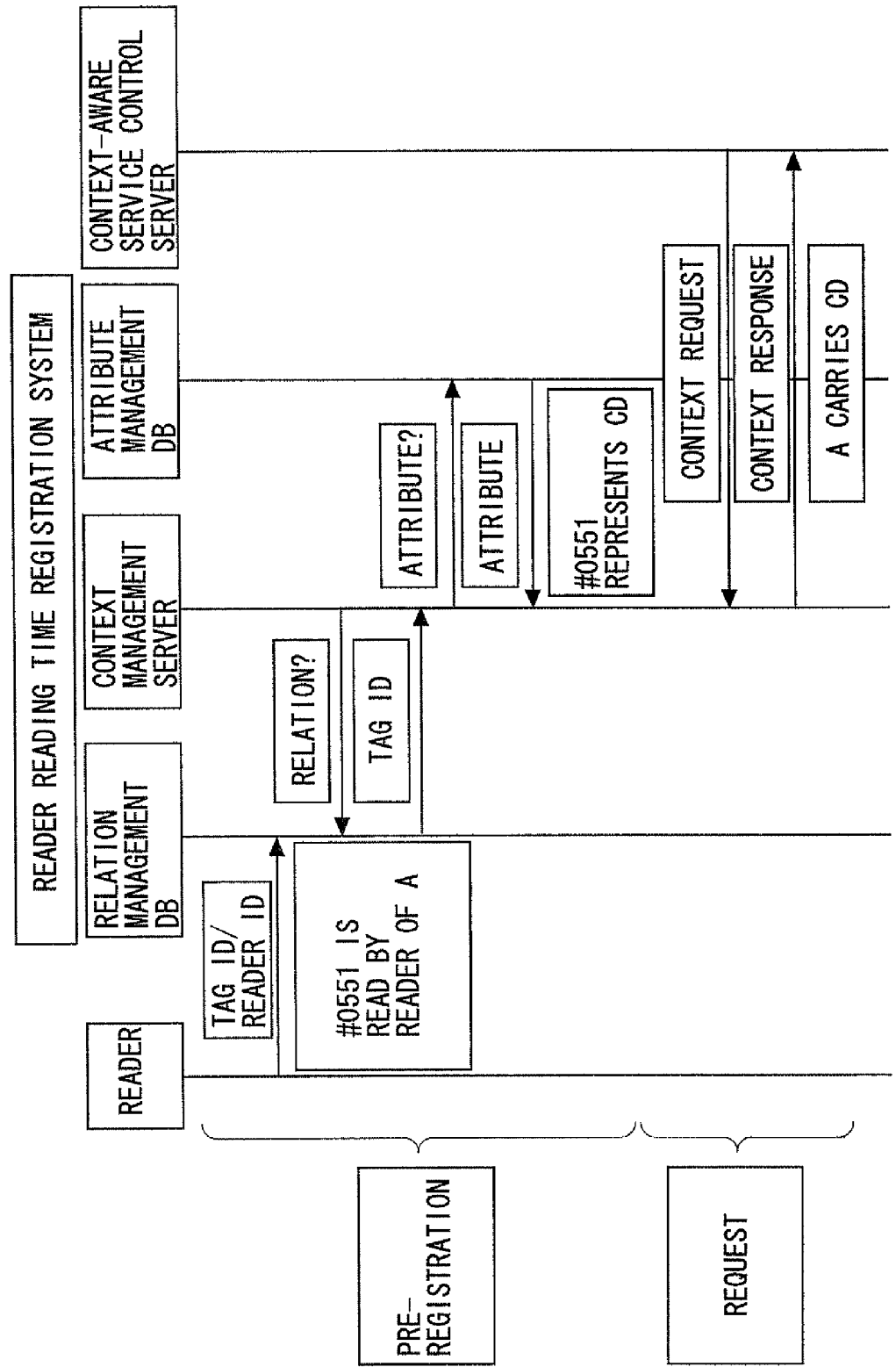
FIG. 23 is a flowchart of an operation in an attribute information registration system in one embodiment of the network/service control system of the present invention.
Figure 24:
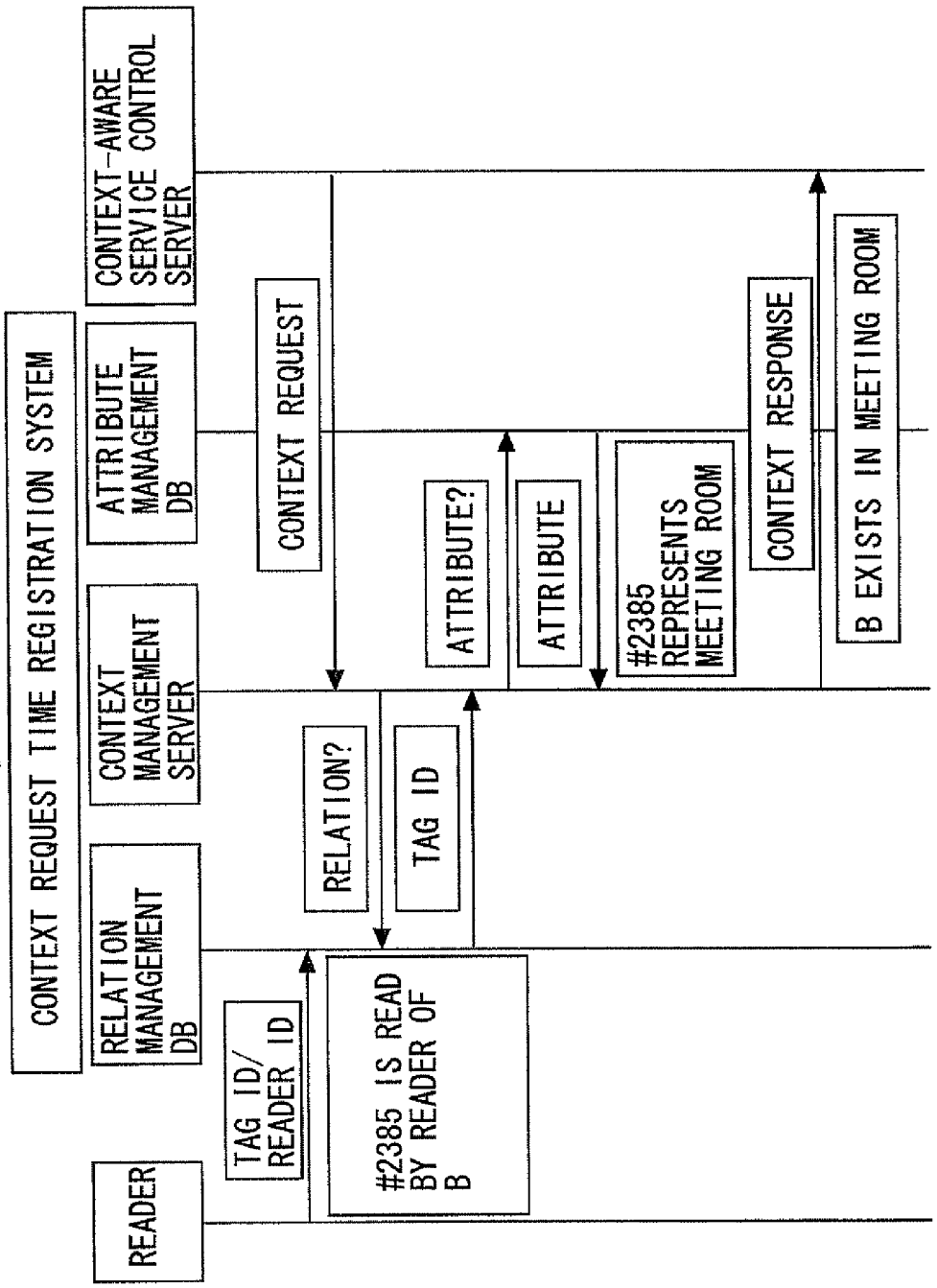
FIG. 24 is a flowchart of the operation in the attribute information registration system in one embodiment of the network/service control system of the present invention.

Next, an attribute information registration system implemented by the user context sensing/management unit 214 of the network/service control system of the present invention, will be described with reference to FIGS. 23 and 24. FIGS. 23 and 24 are flowcharts of an operation of the attribute information registration system in one embodiment of the network/service control system of the present invention. Note that this working example is an example of providing the user context sensing/management unit 214 on a context management server different from the service control server 203. Further, the relation management DB and the attribute management DB are provided in the context management server.

At first, an example of the relation management shown in FIGS. 23 and 24 will be explained. The relation management connotes the management of the relation between the user and the object ID. The relation management is exemplified by information that, e.g., "A" has #0551 and information that "B" exists in #2385.

Further, the example of the attribute management shown in FIGS. 23 and 24 will be described. The attribute management connotes the management of the attribute of the object. The attribute management is exemplified by information that, e.g., #0551 is the CD and information that #2385 is the meeting room.

Moreover, an example of the context management shown in FIGS. 23 and 24 will be explained. The context management connotes the management of the relation between the user and the object. The context management is exemplified by information that "A" possesses the CD and information that "B" exists in the meeting room.

The attribute information registration system shown in FIG. 23 is a system of inputting the attribute when the reader reads the RFID. The example illustrated in FIG. 23 is that a tag ID and a reader ID are transmitted to the relation management DB from the reader. The information transmitted herein is information that, e.g., the reader of "A" reads the electronic tag having the identifying information of #0551.

Next, the context management server acquires the relation between the user and the object from the relation management DB. The tag ID is transmitted to the context management server from the relation management DB. The context management server acquires the attribute from the attribute management DB. The attribute is transmitted to the context management server from the attribute management DB. The attribute transmitted herein is information that, e.g., #0554 is the CD.

Next, the context-aware service control server sends a context request to the context management server. The context management server sends a context response to the context-aware service control server. The context response transmitted individually is information that, e.g., "A" possesses the CD.

The attribute information registration system illustrated in FIG. 24 performs nothing when the reader reads the RFID. The attribute information registration system shown in FIG. 24 is, however, a system of inputting the attribute when the necessity arises.

In the example illustrated in FIG. 24, the reader sends the tag ID and the reader ID to the relation management DB. The information transmitted herein is information that, e.g., #2385 is read by the reader of "B".

Next, the context-aware service control server sends a context request to the context management server. Subsequently, the context management server acquires the relation between the user and the object from the relation management DB. Then, the tag ID is transmitted to the context management server from the relation management DB. Next, the context management server acquires the attribute of the object from the attribute management PB. Then, the attribute is sent to the context management server from the attribute management DB. This attribute is information that, e.g., #2385 is the meeting room.

The context management server sends a context response to the context-aware service control server. The context response transmitted individually is information that, e.g., "B" exists in the meeting room.

Herein, a process that the context management server queries the relation management DB about the relation between the user and the object is triggered by making, as illustrated in FIG. 24, an explicit request for the context and is triggered automatically when checking consistency.

Figure 25:
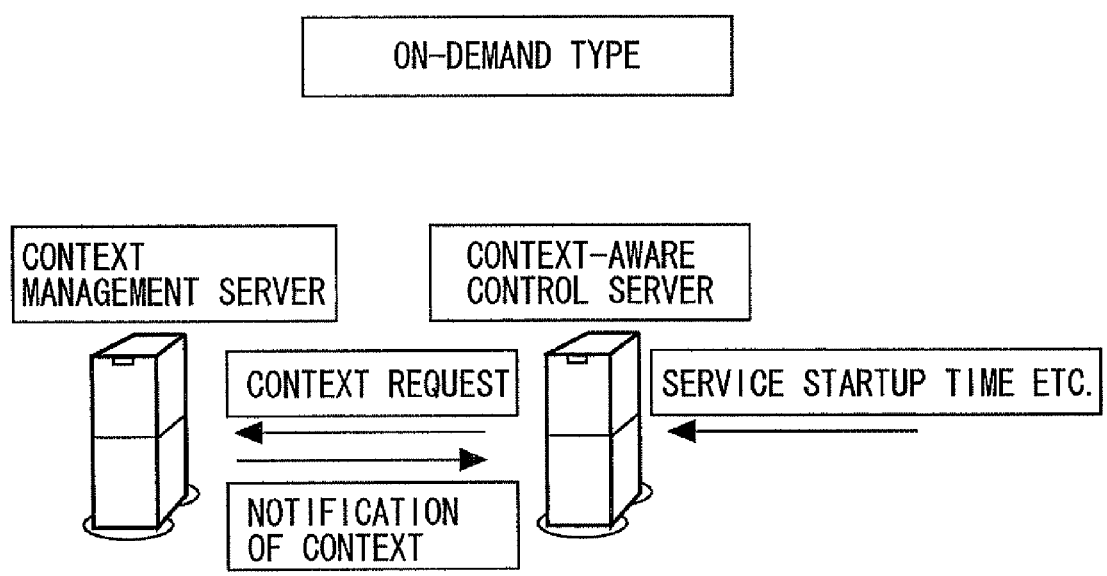
FIG. 25 is a conceptual diagram of a context notifying system in one embodiment of the network/service control system of the present invention.

Next, the necessity-based first example illustrated in FIG. 24 will be described with reference to FIG. 25. The necessity-based first example is a system provided for the service to be requested, i.e., an on-demand type context notifying system. FIG. 25 is a conceptual diagram of the context notifying system in one embodiment of the network/service control system of the present invention.

In the on-demand type context notifying system, as illustrated in FIG. 25, when the service is started up by the user or the service provider or the NW operator and so on, the service control unit 215 sends a context request to the user context sensing/management unit 214, or the NW control unit 213 sends a context request to the NW context sensing/management unit 212. Then, the user context sensing/management unit 214 or the NW context sensing/management unit 212 notifies the service control unit 215 or the NW control unit 213 of the context. In the case of FIG. 23 and in the case of FIG. 24, both of sequences belong to this pattern.

Figure 26:
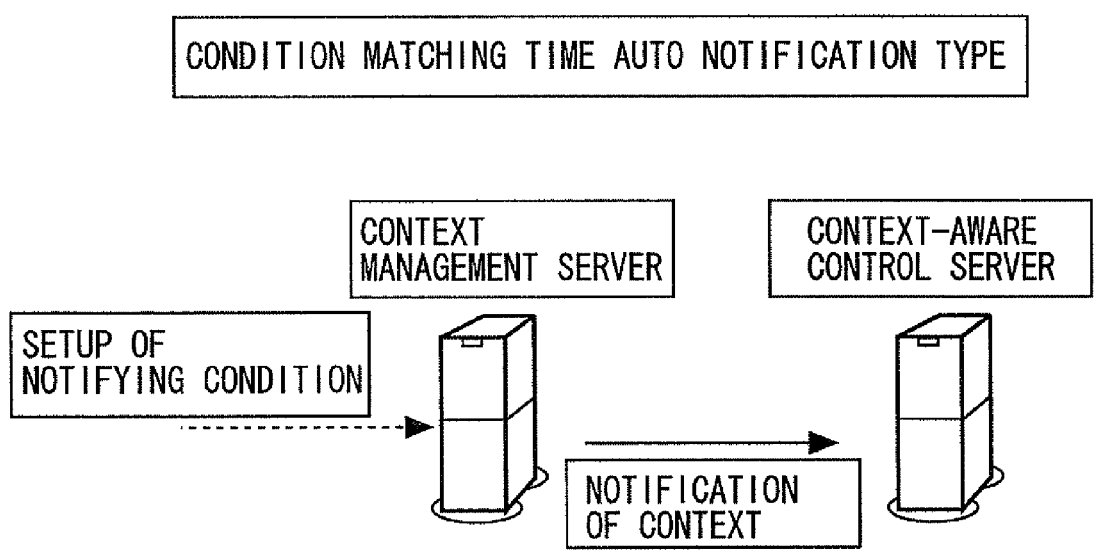
FIG. 26 is a conceptual diagram of the context notifying system in one embodiment of the network/service control system of the present invention.

Next, the necessity-based second example illustrated in FIG. 24 will be described with reference to FIG. 26. FIG. 26 is a conceptual diagram of the context notifying system in one embodiment of the network/service control system of the present invention. The necessity-based second example is a system provided for a context matching check to be requested, i.e., an at-the-condition-matching-time auto notification type context notifying system. The "context matching check" connotes checking whether or not the object attribute shown in the user context is coincident with the registered object attribute. As illustrated in FIG. 26, when a certain condition is met, the user context sensing/management unit 214 spontaneously notifies the service control unit 215 of the context. This condition can be exemplified by a case where, for instance, a predetermined person arrives at a predetermined place.

Figure 27:
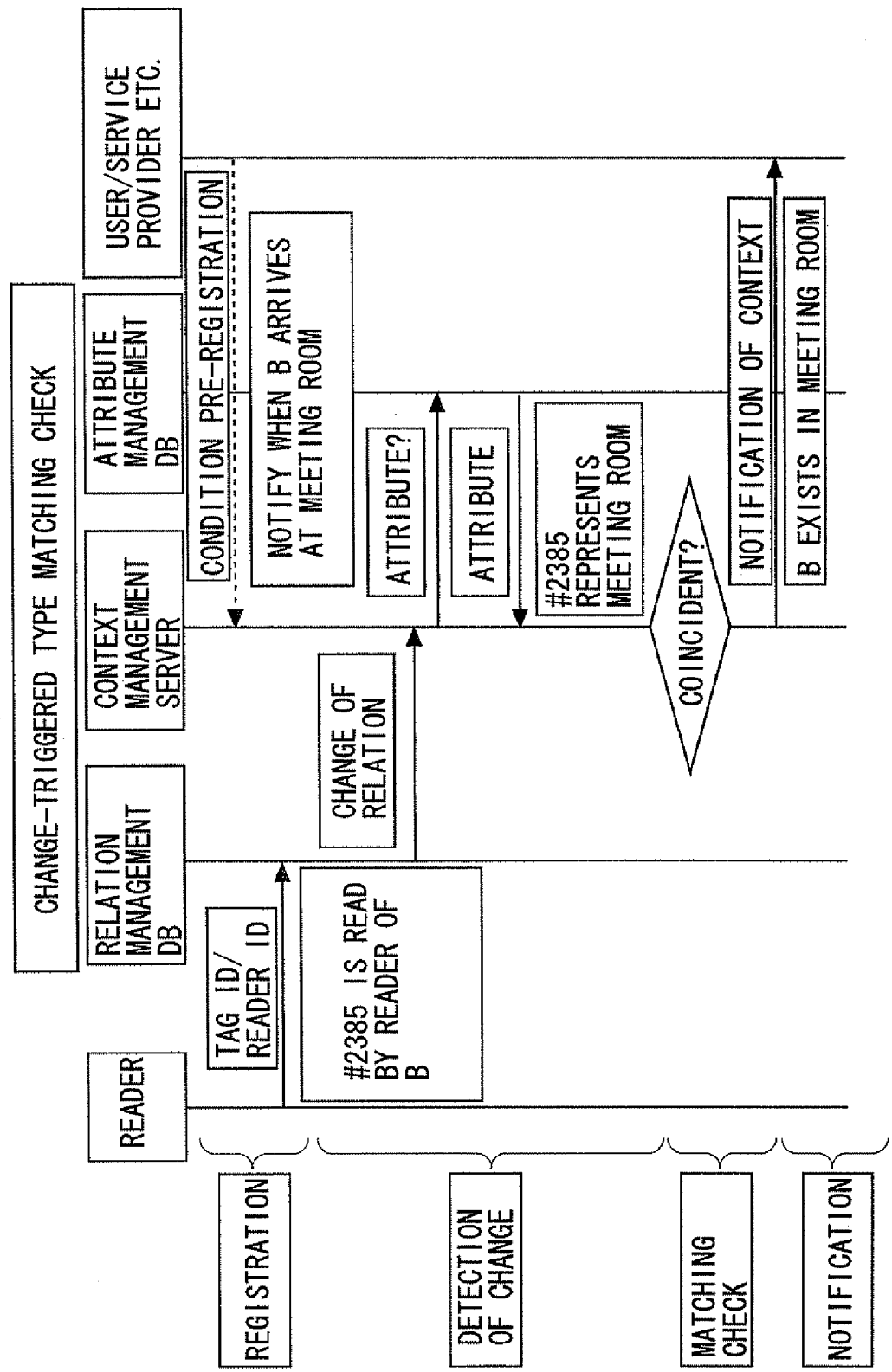
FIG. 27 is a flowchart of an operation in a condition matching check system in one embodiment of the network/service control system of the present invention.

A first example of the condition establishment check in the case of the at-the-condition-matching-time auto notification type in FIG. 26, will be described with reference to FIG. 27. FIG. 27 is a flowchart of an operation of the condition matching check system in one embodiment of the network/service control system of the present invention. In the first example of the condition establishment check in FIG. 26, the execution of the check is triggered by occurrence of a change in context such as when the content of the relation management changes.

As illustrated in FIG. 27, the user, the service provider, etc previously register the condition in the context management DB. The condition registered herein is exemplified by a condition that the notification is given when, e.g., "B" arrives at the meeting room.

Then, the reader transmits the tag ID and the reader ID to the relation management DB. The information transmitted herein is information that, e.g., #2385 is read by the reader of "B". Then, the relation management DB notifies the context management DB of a relational change.

Subsequently, the context management DB queries the attribute management DB about the object attribute. The attribute management DB transmits the attribute to the context management DB. The attribute transmitted herein is information that, e.g., #2385 is the meeting room.

Then, the context management DB determines whether or not the information transmitted from the relation management DB gets coincident with the information transmitted from the user and the service provider and so on. Subsequently, the context management DB, if the information transmitted from the relation management DB gets coincident with the information transmitted from the user and the service provider and so on, notifies the user and the service provider and so on of the context. The information notified herein is information that, e.g., "B" exists in the meeting room.

Figure 28:
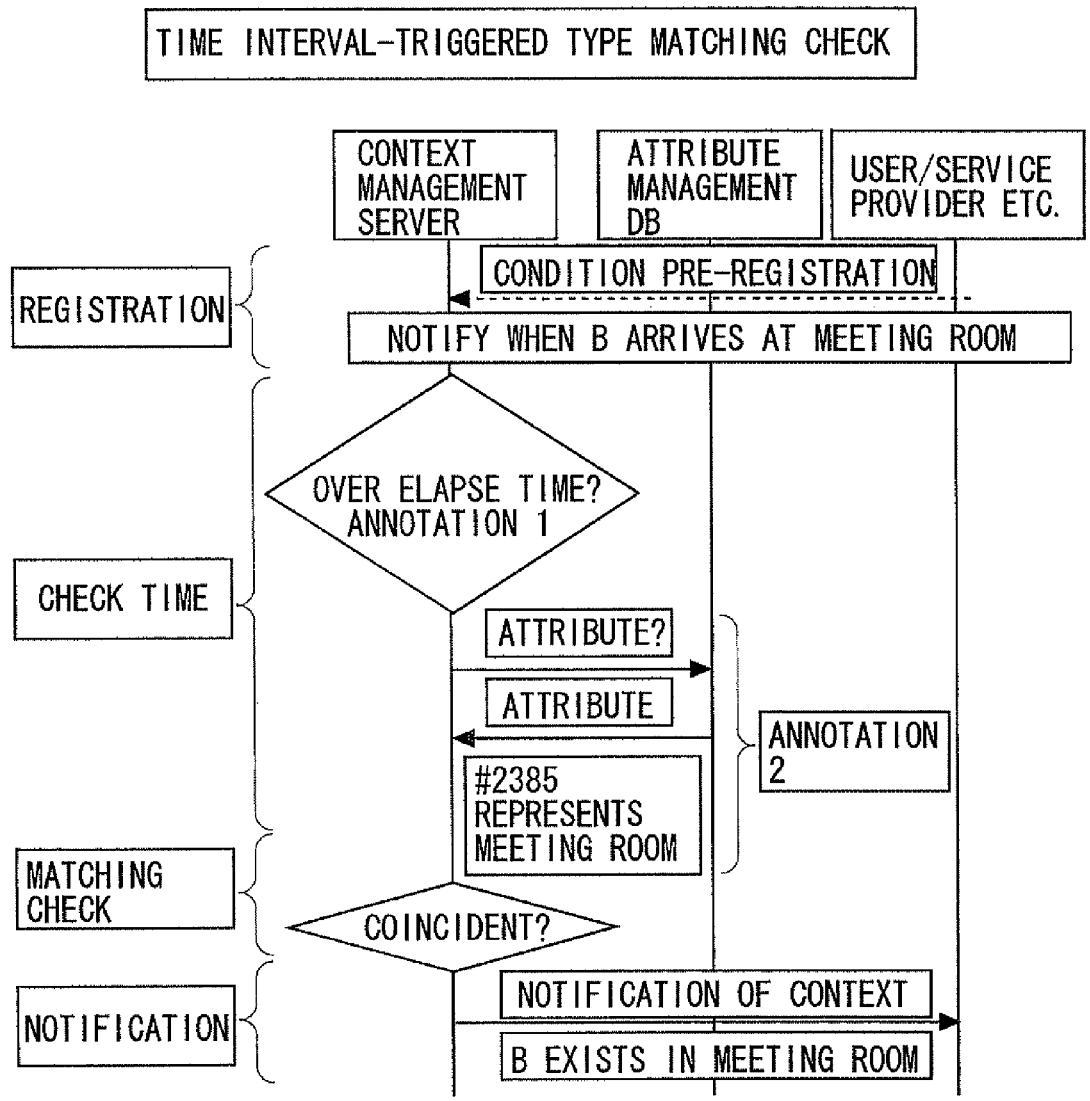
FIG. 28 is a flowchart of the operation in the condition matching check system in one embodiment of the network/service control system of the present invention.

Next, a second example of the condition establishment check in the case of the at-the-condition-matching-time auto notification type in FIG. 26, will be described with reference to FIG. 28. FIG. 28 is a flowchart of an operation of the condition matching check system in one embodiment of the network/service control system of the present invention. The second example of the condition establishment check in FIG. 26 is that the establishment of the condition is checked by use of the time. For instance, in the second example, the condition establishment check in FIG. 26 is done in a way that expands or shortens a time interval at a predetermined period or stepwise from the check time, Further, the second example enables also the establishment of the condition to be checked by use of other elements in addition to the time. For instance, the second example, if a start of the service is triggered by getting off a train and if it is known to have got on the train, the establishment of the condition, i.e., getting off the train, is checked at the shorter time interval than in the case of not getting on the train.

In the example shown in FIG. 28, the user and the service provider and so on previously register the condition in the context management DB. An implementation mode requirement registered herein is a condition that, e.g., the notification is given when "B" arrives at the meeting room.

Then, the context management DB checks whether over an elapse time or not. Herein, a focus is put on not the time interval but the time. Then, the context management unit, if over the elapse time, queries the attribute management DB about the object attribute. Then, the attribute management DB transmits the object attribute to the context management DB. The information transmitted herein is information that, e.g., #2385 is the meeting room. Herein, the process, in which the attribute management DB transmits the attribute to the context management DB, gets unnecessary if the attribute has already been known.

Then, the context management DB determines whether or not the information previously registered by the user and the service provider and so on is coincident with the information transmitted from the attribute management DB. Subsequently, the context management DB, if the information previously registered by the user and the service provider and so on is coincident with the information transmitted from the attribute management DB, notifies the user and the service provider and so on of the context. Herein, the context notified is information that, e.g., "B" exists in the meeting room.

Next, a third example of the condition establishment check in the case of the at-the-condition-matching-time auto notification type in FIG. 26, will be explained. The third example is that the condition establishment check in FIG. 26 is conducted at predetermined time on a predetermined day.

What is claimed is:

1. A network/service control method comprising:
   acquiring automatically, when providing a communication service to a user, a user context defined as dynamic knowledge information associated with the user drawn from at least one of a user's place, user's belongings, an environment surrounding the user and a past behavior pattern of the user;
   acquiring a user profile defined as information about a user's favorite registered previously by the user at arbitrary timing; and
   determining network requirements for providing the communication service on the basis of the user context and the user profile,
   wherein the user context is dynamically changed.

2. A network/service control method according to claim 1, further comprising:
   acquiring a network context defined as knowledge information about a traffic context, network performance and information obtained from operating experiences;
   acquiring an operation policy defined as information about a network operation policy registered previously at arbitrary timing; and
   allocating network resources for providing the communication service to the user on the basis of the network requirements, the network context and the operation policy.

* * * * *